United States Patent
Diesenreiter et al.

(10) Patent No.: US 12,427,708 B2
(45) Date of Patent: Sep. 30, 2025

(54) EXTRUSION DEVICE AND EXTRUSION METHOD

(71) Applicant: EXELLIQ AUSTRIA GMBH, Nussbach (AT)

(72) Inventors: Wolfgang Diesenreiter, Kremsmünster (AT); Karl Gebesmaier, Kirchdorf/Krems (AT)

(73) Assignee: EXELLIQ AUSTRIA GMBH, Nassbach (AT)

( * ) Notice: Subject to any disclaimer, the term of this patent is extended or adjusted under 35 U.S.C. 154(b) by 0 days.

(21) Appl. No.: 17/769,217

(22) PCT Filed: Oct. 15, 2020

(86) PCT No.: PCT/EP2020/079106
§ 371 (c)(1),
(2) Date: Apr. 14, 2022

(87) PCT Pub. No.: WO2021/074328
PCT Pub. Date: Apr. 22, 2021

(65) Prior Publication Data
US 2024/0116234 A1    Apr. 11, 2024

(30) Foreign Application Priority Data
Oct. 15, 2019   (DE) .................. 10 2019 215 876.5

(51) Int. Cl.
*B29C 48/92* (2019.01)
*B29C 48/00* (2019.01)
(Continued)

(52) U.S. Cl.
CPC .......... *B29C 48/92* (2019.02); *B29C 48/0022* (2019.02); *B29C 48/32* (2019.02);
(Continued)

(58) Field of Classification Search
CPC ...................................... B29C 48/27
See application file for complete search history.

(56) References Cited

U.S. PATENT DOCUMENTS

| 3,148,231 A | 9/1964 | William |
| 3,890,078 A | 6/1975 | Straumanis |
| (Continued) | | |

FOREIGN PATENT DOCUMENTS

| AT | 414225 B | 10/2006 |
| AT | 519491 A1 | 7/2018 |
| (Continued) | | |

OTHER PUBLICATIONS

English Translation of DE2005182 (Year: 2025).*
(Continued)

*Primary Examiner* — Alison L Hindenlang
*Assistant Examiner* — Alexander A Wang
(74) *Attorney, Agent, or Firm* — Maschoff Brennan

(57) ABSTRACT

It is provided an extrusion device for a plastic profile, in particular a hollow chamber profile, with an extruder, an extrusion nozzle arranged at the exit of the extruder for forming the plastic profile the plastic profile subsequently being guided through a calibration device, a downstream removal device for the plastic profile, a cutting device for cutting off parts of the extruded plastic profile and a weighing device for measuring the profile weight. A profile monitoring device is provided for detecting at least one profile parameter of the plastic profile in the extrusion direction after it has emerged from the extrusion nozzle and/or a process monitoring device is provided for detecting at least one process parameter in and/or before of the extruder, the extrusion nozzle, the calibration device, the removal device and/or the cutting device.

20 Claims, 15 Drawing Sheets

(51) Int. Cl.
*B29C 48/32* (2019.01)
*B29C 71/00* (2006.01)

(52) U.S. Cl.
CPC ............... *B29C 2071/0045* (2013.01); *B29C 2948/92152* (2019.02); *B29C 2948/9218* (2019.02); *B29C 2948/92247* (2019.02); *B29C 2948/92295* (2019.02); *B29C 2948/92447* (2019.02)

(56) References Cited

U.S. PATENT DOCUMENTS

| | | | |
|---|---|---|---|
| 4,029,452 | A | 6/1977 | Schippers |
| 4,171,193 | A | 10/1979 | Rahlfs |
| 4,246,212 | A | 1/1981 | Upmeier |
| 4,382,761 | A | 5/1983 | Daubenbuechel |
| 5,397,514 | A | 3/1995 | Breil |
| 6,287,102 | B1 | 9/2001 | Franz |
| 7,244,378 | B2 | 7/2007 | Haruo et al. |
| 7,630,868 | B2 * | 12/2009 | Turner ............... G05B 13/027 706/14 |
| 7,896,636 | B2 | 3/2011 | Shiori et al. |
| 8,463,422 | B2 | 6/2013 | Betsche |
| 9,636,861 | B2 | 5/2017 | Krumböck |
| 10,416,617 | B2 | 9/2019 | Shiraishi |
| 2003/0158610 | A1 | 8/2003 | Jamal-Ahmad et al. |
| 2004/0256755 | A1 | 12/2004 | Baba et al. |
| 2005/0027380 | A1 | 2/2005 | Bellm |
| 2005/0126610 | A1 * | 6/2005 | Hoser ............... A45D 27/46 134/186 |
| 2006/0138690 | A1 | 6/2006 | Schwaiger |
| 2006/0224540 | A1 | 10/2006 | Shioir et al. |
| 2007/0106420 | A1 | 5/2007 | Wyrwoll |
| 2008/0157426 | A1 | 7/2008 | Kotwis et al. |
| 2009/0174107 | A1 | 7/2009 | Koessl |
| 2010/0031789 | A1 | 2/2010 | Lupke |
| 2011/0001260 | A1 | 1/2011 | Leil |
| 2012/0245909 | A1 | 9/2012 | Bierdel |
| 2014/0035189 | A1 * | 2/2014 | Krumbock ............ B29C 48/151 425/141 |
| 2015/0360393 | A1 * | 12/2015 | Watanabe ............ B29C 48/694 425/143 |
| 2016/0263805 | A1 | 9/2016 | Deppe |
| 2018/0181694 | A1 | 6/2018 | Springer |
| 2018/0361646 | A1 | 12/2018 | Dohmann |
| 2019/0255753 | A1 * | 8/2019 | Pramberger ............ B29C 48/92 |

FOREIGN PATENT DOCUMENTS

| | | |
|---|---|---|
| CN | 101850377 A | 10/2010 |
| CN | 203110308 U | 8/2013 |
| CN | 204338757 U | 5/2015 |
| CN | 108941235 A | 12/2018 |
| DE | 1454787 A1 | 2/1969 |
| DE | 2005182 A1 * | 8/1971 |
| DE | 2304243 A1 | 8/1973 |
| DE | 2456986 A1 | 6/1976 |
| DE | 2700003 A1 | 7/1978 |
| DE | 2816583 A1 | 10/1979 |
| DE | 2940418 A1 | 4/1981 |
| DE | 3536329 A1 | 4/1987 |
| DE | 3832393 A1 | 4/1990 |
| DE | 4033974 A1 | 4/1992 |
| DE | 4433593 B4 | 6/1995 |
| DE | 4434654 A1 | 4/1996 |
| DE | 29716343 U1 | 11/1997 |
| DE | 10014507 A1 | 9/2001 |
| DE | 10224414 B4 | 8/2003 |
| DE | 10312256 B4 | 11/2004 |
| DE | 102004026641 A1 | 1/2006 |
| DE | 102004041891 B3 | 4/2006 |
| DE | 102006031268 A1 | 1/2008 |
| DE | 102009059073 A1 | 6/2011 |
| DE | 102010040984 A1 | 3/2012 |
| DE | 102011007618 A1 | 10/2012 |
| DE | 102013220619 A1 | 4/2015 |
| DE | 102015106398 A1 | 10/2016 |
| DE | 102016009203 A1 | 2/2017 |
| DE | 102018006035 A1 | 8/2019 |
| EP | 153511 B1 | 9/1985 |
| EP | 197647 B1 | 10/1986 |
| EP | 403280 B1 | 12/1990 |
| EP | 650409 B1 | 5/1995 |
| EP | 901053 B1 | 3/1999 |
| EP | 1166994 A1 | 1/2002 |
| EP | 2085169 A1 | 8/2009 |
| EP | 2392446 A1 * | 12/2011 ............ B29C 48/09 |
| JP | 2016-221730 A | 12/2016 |
| JP | 201622173 A | 12/2016 |
| WO | 2006050549 A2 | 5/2006 |
| WO | 2009069081 A1 | 6/2009 |
| WO | 2010/115914 A1 | 10/2010 |
| WO | 2012035125 A2 | 3/2012 |
| WO | 2012175430 A1 | 12/2012 |
| WO | 2016128829 A1 | 8/2016 |
| WO | 2018071942 A1 | 4/2018 |

OTHER PUBLICATIONS

English Translation of EP2392446 (Year: 2024).*
Extended European Search Report dated Apr. 22, 2024 as received in application No. 23218536.3.
Extended European Search Report dated Apr. 23, 2024 as received in application No. 23218567.8.
Eurasian Search Report dated May 21, 2024 as received in Application No. 202490069.
Eurasian Search Report dated Jun. 27, 2024 as received in Application No. 202490070.

* cited by examiner

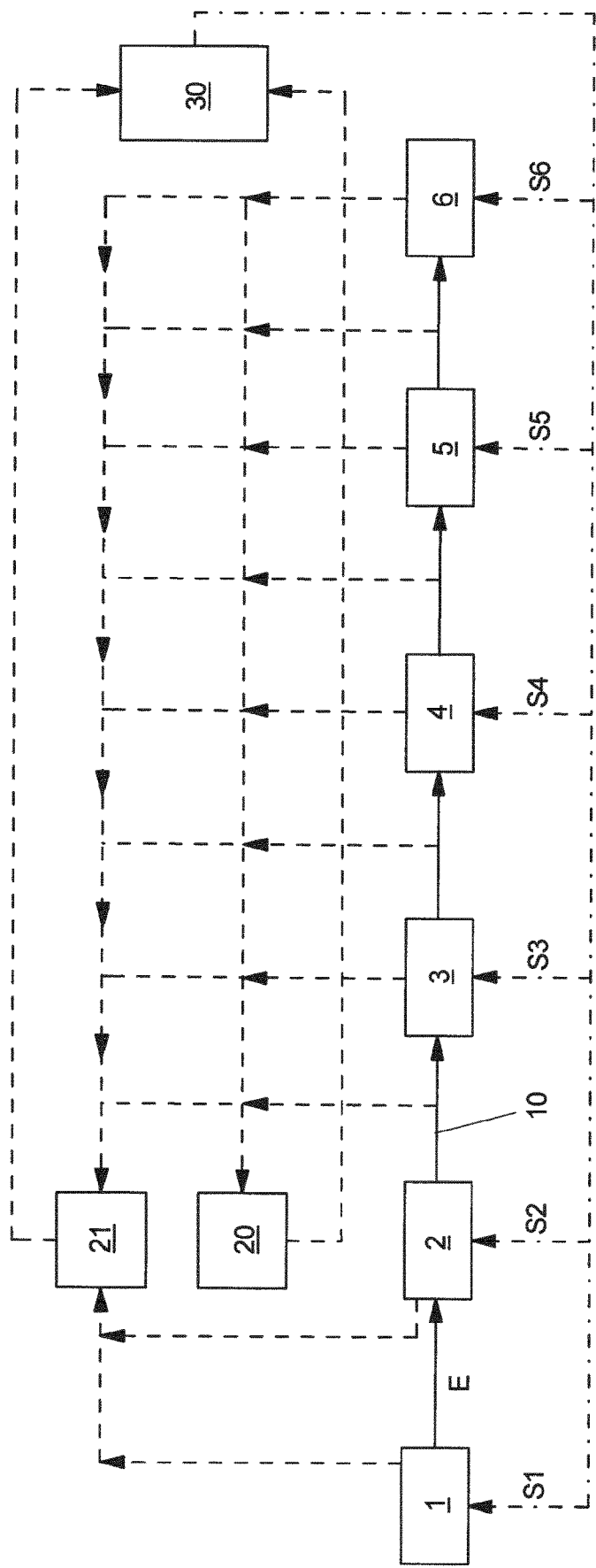

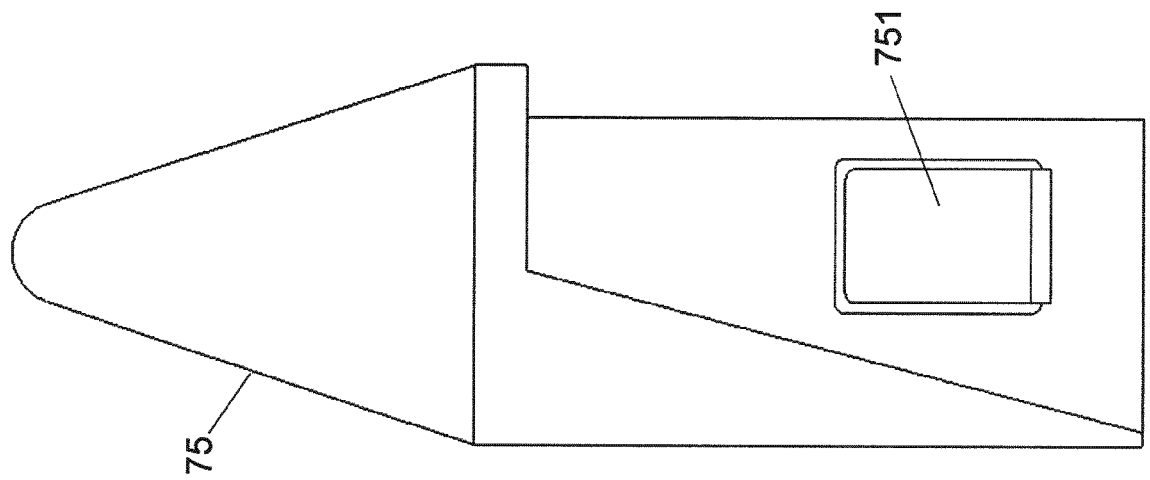
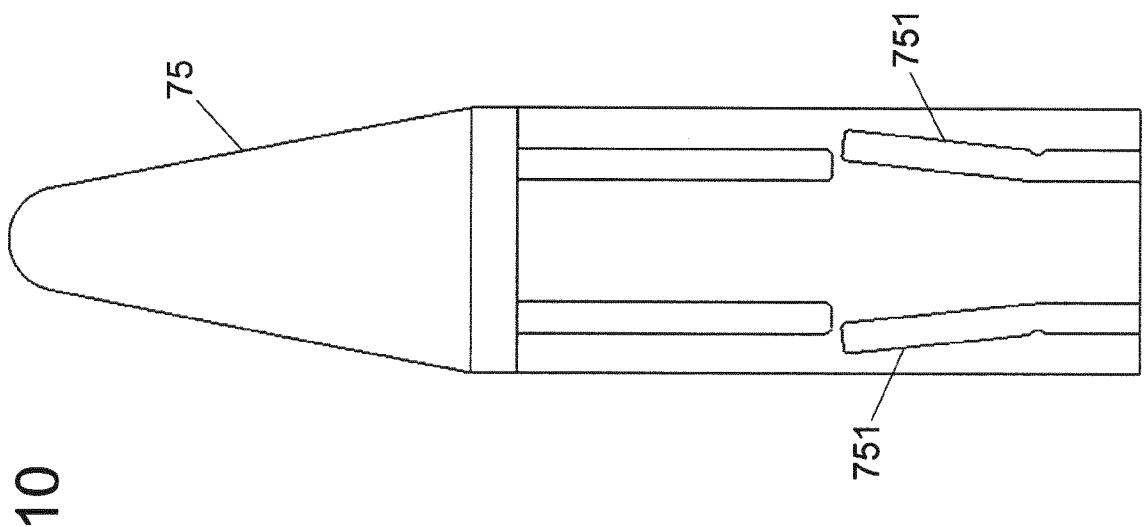
FIG 10

EXTRUSION DEVICE AND EXTRUSION METHOD

CROSS-REFERENCE TO A RELATED APPLICATION

This application is a National Phase Patent Application of International Patent Application Number PCT/EP2020/079106, filed on Oct. 15, 2020, which claims priority of German Patent Application Number 10 2019 215 876.5, filed on Oct. 15, 2019.

BACKGROUND

The proposed solution relates to an extrusion device and an extrusion method.

Extrusion devices for the production of plastic profiles are known in principle. Characteristically, solid plastic material is melted in an extruder and then shaped through an extrusion nozzle. The plastic profile must then be solidified in compliance with strict quality requirements for dimensional accuracy and surface quality so that it can be cut to size in a cutting device.

The plastic profile can be a hollow chamber profile, for example. Such plastic profiles may be intended for the production of window frames. The extrusion nozzle for forming the plastic profile is located at an exit of the extruder. After extrusion from the exit of the extruder, the plastic profile is passed through a calibration device. The calibration device is followed by a removal device. With the removal device, a removal force can be introduced into the plastic profile, so that the plastic profile is pulled through the calibration device and, if necessary, through further devices along an extrusion direction. Downstream of the removal device is a cutting device for cutting off parts of the extruded plastic profile. For example, the plastic profile can be cut to length in sections with the cutting device.

SUMMARY

The object is to improve this process economically and qualitatively.

The object is solved by an extrusion device with features as described herein.

Accordingly, a profile monitoring device may be provided for detecting at least one profile parameter of the plastic profile in the extrusion direction after it exits the extrusion nozzle.

Additionally or alternatively, a process monitoring device may be provided for detecting at least one process parameter in and/or before the extruder, the extrusion nozzle, the calibration device, the removal device and/or the cutting device.

The data from the profile monitoring device and/or the process monitoring device can be used by a control device to set at least one manipulated variable or a set of manipulated variables on the extruder, on the extrusion nozzle, on the calibration device, on the removal device and/or on the cutting device as a function of the data.

For example, the data can be generated by the profile monitoring device from the at least one profile parameter of the plastic profile. Likewise, the data may be generated by the process monitoring device from the at least one process parameter. The data may thus comprise at least one profile parameter and/or at least one process parameter.

In one embodiment, the at least one profile parameter is at least one wall thickness, in particular a main wall thickness, or a filling level of the plastic profile. The plastic profile may have one or more walls, the wall thicknesses of which may be measurable by the profile monitoring device. Accordingly, multiple wall thicknesses may be included in the data generated by the profile monitoring device. In particular, the at least one profile parameter may be a dimension of the plastic profile, for example a height and/or a width of the plastic profile, each transverse to the extrusion direction. Furthermore, the at least one profile parameter can be at least one parameter concerning a shrinkage of the plastic profile. A shrinkage can be, for example, a reduction of a length of the plastic profile.

In one embodiment, the at least one profile parameter is at least one parameter concerning a surface quality of the plastic profile. The surface quality can be determined, for example, by optical properties of the surface. In particular, the surface quality can be characterized by a colour or a discolouration of the surface. The surface quality can also be characterized by the ability of the plastic profile to reflect light in whole or in part. In particular, the at least one parameter may relate to a glossiness or a mattness of the plastic profile. The at least one profile parameter may also be at least one parameter relating to a streakiness of the plastic profile. A streakiness can be formed, for example, by unevenness that regularly occurs in stripes or stripe-like discolourations.

In one embodiment, the at least one profile parameter is at least one parameter of a shape deviation of the plastic profile from a predetermined shape. The at least one parameter determined in this way can be understood as a difference between the predetermined shape of the plastic profile and the shape of the plastic profile determined with the profile monitoring device. The shape deviation may in particular be determined by a curvature parameter and/or an angle parameter. The curvature parameter may, for example, indicate how convex or concave a surface of the plastic profile is shaped. The profile monitoring device may be arranged to determine whether a hollow or crowned plastic profile is present. In particular, the at least one plastic profile shape deviation parameter may be a degree of crowning of the plastic profile.

In one embodiment, the at least one profile parameter is at least one temperature of the plastic profile. The at least one profile parameter can further be a weight per metre of the plastic profile, i.e. a weight of the plastic profile per unit length, and/or a surface quality.

From the at least one profile parameter, the profile monitoring device may generate data comprising, for example, a concrete indication of the at least one profile parameter, for example "profile height", and/or a possibly associated scalar quantity, for example "62 mm".

In one embodiment, an optical detection device is provided for wall thicknesses of the plastic profile, for the surface quality of the plastic profile and/or the shape deviation of the plastic profile. In such an embodiment, the at least one profile parameter can be at least one parameter concerning a surface quality of the plastic profile. In one embodiment, the detection device for wall thicknesses of the plastic profile may detect the wall thicknesses with sound waves or electromagnetic radiation. In particular, the detection device may determine the wall thicknesses of the plastic profile with ultrasonic or terahertz measurements.

In the following, some process parameters are shown that can be used as an alternative or in addition to the profile parameters.

First, the at least one process parameter may be at least one quality parameter of the plastic itself.

The at least one process parameter can also be at least one speed value of the plastic profile in the extrusion device. The at least one speed value of the plastic profile in the extrusion device can, for example, characterize how fast the plastic profile moves along the extrusion direction.

In one embodiment, the at least one process parameter is at least one geometric alignment of the calibration device and/or the removal device with the extrusion nozzle. The at least one geometric alignment may comprise, for example, an angle and/or a distance at which the calibration device and/or the removal device are arranged relative to the extrusion nozzle.

In one embodiment, the at least one process parameter is at least one temperature and/or pressure in the extruder, in the extrusion nozzle, in the calibration device and/or in the removal device. In one embodiment, a temperature measuring device and/or a pressure measuring device is provided in the extruder, in the extrusion nozzle, in the calibration device and/or in the removal device in order to measure the temperature and/or the pressure there respectively.

In one embodiment, the at least one process parameter is at least one force measurement on the removal device. The at least one process parameter may characterize a removal force that the removal device exerts on the plastic profile. Likewise, the at least one process parameter may be at least one measurement of the removal speed. The at least one process parameter may characterize a removal speed at which the plastic profile travels through the removal device along the extrusion direction.

In one embodiment, the at least one process parameter is at least one length measurement at the cutting device. The at least one process parameter may characterize a length of the sections of the plastic profile produced at the cutting device. The at least one process parameter may also be at least one weighing at the cutting device. For the at least one weighing, the section of the plastic profile produced at the cutting device may be weighed.

In addition, the at least one process parameter can be a load on a drive of the extruder. In particular, the at least one process parameter can be a motor load of the extruder.

In one embodiment, the at least one manipulated variable is a driving parameter of the extrusion device. The at least one manipulated variable can, for example, be a manipulated variable at the extruder. At the extruder, the at least one manipulated variable may be, for example, a mixing setting of at least one plastic material fed to the extruder. For example, the at least one manipulated variable may be a mixing ratio for different types of plastics at the extruder.

The at least one manipulated variable on the extruder can also be a temperature of the extruder. The at least one manipulated variable can, for example, be a temperature of a section of the extruder, for example a barrel temperature, in particular before or after degassing of the extruder. In addition, the at least one manipulated variable may be a rotational speed of one or more extrusion screws. The at least one manipulated variable can in particular be a rotational speed of the drive of the extruder.

In one embodiment, the at least one manipulated variable at the extrusion nozzle is a temperature. In one embodiment, the temperature is adjustable by a temperature control device. The temperature can be adjusted locally to an area of the plastic profile by the temperature control device. An area of the plastic profile can, for example, be an area on a cross-section of the plastic profile, such as a corner, an edge or a straight line.

In one embodiment, the at least one manipulated variable is a fluid flow. The at least one manipulated variable can be, for example, a flow rate or a volume throughput per unit of time or temperature of the fluid flow. The fluid flow may temper at least a portion of the plastic profile. The at least one portion of the plastic profile may be, for example, a region at a cross-section of the plastic profile or a region extending along the extrusion direction. The fluid flow may temper the plastic profile or the at least one portion of the plastic profile inside the extrusion nozzle and/or outside the extrusion nozzle. In particular, the fluid flow can temper the plastic profile or the at least one part of the plastic profile in at least one tool zone.

In one embodiment, the at least one manipulated variable is a temperature at the calibration device. Likewise, the at least one manipulated variable can be a pressure at the calibration device. The at least one manipulated variable can also be a temperature and a pressure at the calibration device. The calibration device may in particular be a dry calibration or a wet calibration. Likewise, the calibration device may be a dry and wet calibration. The at least one manipulated variable may also be a water flow rate in the wet calibration. Accordingly, the at least one manipulated variable may be a flow velocity or a flow rate of water through the calibration device per time. It is also conceivable and possible that the calibration device comprises at least one dry calibration and/or at least one wet calibration.

In one embodiment, the at least one manipulated variable is a vacuum at the calibration device. In particular, the at least one manipulated variable may be a vacuum at or from the at least one dry calibration. The at least one manipulated variable can also be a vacuum in the wet calibration.

In one embodiment, the at least one manipulated variable at the calibration device is a change in position of the calibration device, in particular the dry calibration device, with respect to the extrusion nozzle. For example, the at least one manipulated variable at the calibration device can be an angle and/or a distance between the calibration nozzle and the extrusion nozzle.

In a further embodiment, the at least one manipulated variable on the removal device is a removal speed and/or removal force. For example, the at least one manipulated variable can be a rotational speed of a drive of the removal device or a clamping force with which the removal device clamps the plastic profile.

In principle, the at least one manipulated variable can be set manually. For this purpose, an operator can set the at least one manipulated variable depending on the at least one profile parameter and/or the at least one process parameter. For this purpose, a suggestion for a mode of operation of the extrusion device can be transmitted to the operator. The proposal for the mode of operation of the extrusion device may comprise a proposal for at least one manipulated variable. The operator may use a computer to determine the at least one process parameter and/or the at least one profile parameter. Similarly, the operator may use a computer to set the at least one manipulated variable. For example, the computer can be set up to display the suggestion for setting the at least one manipulated variable to the operator on the basis of the at least one profile parameter and/or the at least one process parameter. In particular, software can be provided on the computer for this purpose, which provides an assistance system. In one embodiment, the operator takes a section of a plastic profile as a sample and determines the at least one process parameter and/or the at least one profile parameter, in particular by a quality measurement. The software can provide a suggestion for an optimal driving parameter adjustment based on the quality measurement.

In one example, the at least one profile parameter is a crowning. Based on the quality measurement, the operator can determine, for example, that the crowning is too convex. Based on this, it can be suggested to the operator, in particular by software, to reduce the vacuum in the calibration device, as the plastic profile is overstretched by too high a vacuum. Alternatively or additionally, it can be suggested to the operator to reduce the total output, for example by synchronously reducing the speed of the extrusion screws and optionally or additionally the removal speed. Alternatively or additionally, it may be suggested to the operator to reduce the temperature of the dry calibration. Alternatively or additionally, it may be suggested to the operator to increase the water flow of the dry calibration.

In one embodiment, the at least one profile parameter and/or the at least one process parameter is detectable in-line. In one embodiment, in-line means that the at least one profile parameter and/or the at least one process parameter can be detected directly on the extrusion device. In-line may additionally mean that the at least one profile parameter and/or the at least one process parameter is detectable during operation of the extrusion device. In contrast, off-line may mean that the at least one profile parameter and/or the at least one process parameter is determinable away from the extrusion device or during standstill of the extrusion device or away from the extrusion device. The determination of the at least one profile parameter and/or the at least one process parameter off-line can be carried out iteratively in a predetermined interval, in particular in an interval of several hours, in particular three hours.

For example, the wall thickness of the plastic profile, the surface quality of the plastic profile and/or the shape deviation of the plastic profile can be determined in-line by the optical detection device. In contrast, for example, the wall thickness of the plastic profile can be determined off-line by measuring the plastic profile, for example, after the plastic profile has been removed by an operator.

In one embodiment, the at least one in-line sensed profile parameter and/or the at least one in-line sensed process parameter is usable by the control device to automatically set at least one control signal. In particular, the data of the profile monitoring device and/or the process monitoring device may be usable by the control device to automatically set the at least one control signal in dependence on the data. The at least one control signal may comprise, for example, at least one manipulated variable at the extruder, at the extrusion nozzle, at the calibration device, at the removal device and/or at the cutting device.

In an embodiment in which at least one upstream device is arranged upstream of the extruder, the at least one control signal may additionally or optionally comprise at least one manipulated variable of the at least one upstream device. In particular, the at least one manipulated variable may therefore comprise an in-line monitoring of a melt quality of a plastic melt from which the plastic profile is formed in the extruder, an in-line dry-blend monitoring of the plastic melt and/or a metering by gravimetry of the plastic melt.

The automatic setting of the at least one control signal can be carried out in the absence of an operator. The automatic setting can be made possible by the fact that a relationship, in particular a mathematical, numerical or formulaic relationship, is specified between the at least one profile parameter and the at least one control signal. Likewise, a relationship to the at least one control signal can be specified for the at least one process parameter or a combination between the at least one profile parameter and the at least one process parameter.

The at least one control signal can be automatically adjustable depending on the at least one profile parameter and/or the at least one process parameter. In one embodiment, the at least one profile parameter and/or the at least one process parameter is transmitted at regular intervals to the control device for setting the at least one control signal. In particular, a plurality of control signals can be automatically adjustable simultaneously as a function of the at least one profile parameter and/or the at least one process parameter. Here, at least one current control signal, for example an operating point of the extrusion device, and at least one current process parameter and/or at least one current profile parameter, for example current quality values of the produced plastic profiles, can be assumed. This allows a process window to be maximized in real time during operation of the extrusion device. The process window may comprise a number or interval of possible values of at least one manipulated variable, at least one profile parameter or at least one process parameter that should ideally be considered for optimization. A large process window may allow a larger margin on at least one profile parameter so that changes in process parameters can be compensated for more easily. This can minimize the rejection of plastic profiles with undesirable profile parameters.

In one embodiment, the control device may comprise a means for multi-variable control, wherein the detected profile parameters and/or the detected process parameters serve as input variables.

The control device, for example a programmable logic controller (PLC), can in particular have a control loop for setting the at least one control signal. The control loop can in particular be multidimensional. Likewise, it may be an intelligent, multidimensional control loop. Via the control loop, the at least one profile parameter and/or the at least one process parameter can be linked as input with the at least one control signal as output.

The adjustment of the at least one control signal in dependence of the data may cause a change of the at least one profile parameter and/or the at least one process parameter. In particular, the at least one control signal can be adjusted until at least one desired profile parameter and/or at least one desired process parameter is reached. A magnitude of a deviation of the at least one current profile parameter and/or the at least one current process parameter from the at least one desired profile parameter and/or from the at least one desired process parameter may be used to specify a magnitude of the change in the at least one control signal during adjustment.

Different profile parameters and/or process parameters can be influenced to different degrees by the setting of the at least one control signal. Therefore, at least one sensitivity factor can be specified which indicates how the at least one control signal correlates with the data of the profile monitoring device and/or the process monitoring device. The at least one sensitivity factor may thus indicate a correlation between the at least one control signal on the one hand and the at least one profile parameter and/or the at least one process parameter on the other hand.

The at least one sensitivity factor can be specified manually, automatically or by expert knowledge. In particular, the at least one sensitivity factor may be updatable during operation. For example, the control device may be set up to calculate at least one optimized sensitivity factor from the effect of a change of the at least one control signal on the at least one process parameter and/or the at least one profile parameter. In this respect, the control device can be capable of learning.

In one embodiment, the control device comprises a machine learning means that automatically determines a model, in particular for multi-variable control, for determining the relationships between the at least one profile parameter, the at least one process parameter and the at least one manipulated variable. In particular, the machine learning means can determine the at least one sensitivity factor.

The at least one sensitivity factor may be determinable, for example, by the following method: In a first step, the extrusion device is operated at the operating point with a first value of the at least one manipulated variable and a first set of data from the profile monitoring device and/or the process monitoring device is collected. In a second step, the extrusion device is operated with a second value of the at least one manipulated variable that is different from the first value, and a second set of data from the profile monitoring device and/or the process monitoring device is collected. If necessary, the second step is repeated several times, wherein the second value may be above or below the first value and is in particular varied in a rule-based manner. In a third step, a correlation between the at least one manipulated variable and the data is determined from the first set and the at least one second set of data. The correlation may comprise a strength of a correlation between the at least one manipulated variable and the at least one process parameter and/or the at least one profile parameter.

The correlation can be expressed, for example, by a coefficient matrix that assigns a correlation strength to each combination of the at least one manipulated variable with the at least one profile parameter and/or the at least one process parameter. For example, the output of the extruder at constant profile weight may correlate positively with the crowning, while the removal speed correlates negatively with the crowning and hardly at all with the load on the drive of the extruder.

The at least one sensitivity factor can thus be a coefficient matrix which indicates how the at least one process parameter and/or the at least one profile parameter, i.e. in particular the quality of the plastic profile, changes as soon as the at least one manipulated variable, i.e. in particular a driving parameter, is changed.

By the machine learning means, the at least one sensitivity factor may be further adaptable during operation of the extrusion device to more accurately predict how the at least one process parameter and/or the at least one profile parameter will change when the at least one manipulated variable is changed.

In one embodiment, a simulation system is provided with which an effect of a change of the at least one control signal on the at least one profile parameter and/or the at least one process parameter can be simulated. The simulation system can be set up to determine the at least one sensitivity factor by simulation and to transmit it to the control device.

In one embodiment, the control device is set up to determine the at least one manipulated variable during operation using the at least one sensitivity factor in order to achieve at least one desired profile parameter and/or at least one desired process parameter. The at least one manipulated variable can be determined in particular from at least one current manipulated variable, in particular current driving parameters, and from the at least one profile parameter and/or the at least one process parameter, in particular current quality values. Thus, optimized driving parameters that produce optimized quality values can be determined from current driving parameters and current quality values on the basis of knowledge about the relationship between a change in driving parameters and a change in quality values.

In one embodiment, the control device is set up to preset a desired interval for the at least one profile parameter and/or the at least one process parameter. The control device can in particular have a means for carrying out a mathematical optimization of a set of manipulated variables under at least one constraint with respect to a value of the at least one profile parameter, the at least one process parameter and/or the at least one manipulated variable of the set of manipulated variables. The at least one constraint may, for example, be expressible as a penalty function.

The control device can perform a mathematical optimization of the at least one manipulated variable or a set of manipulated variables, for example, under the condition that the at least one profile parameter, the at least one process parameter, at least one further manipulated variable and/or at least one manipulated variable of the set of manipulated variables lies in a desired interval.

When optimizing a set of manipulated variables with at least one manipulated variable and at least one further manipulated variable, for example, the at least one further manipulated variable should lie in a desired interval. The at least one further manipulated variable can then be included in the optimization with a 1 to 1 relationship to itself.

In principle, the relationship between the at least one manipulated variable to be optimized and the at least one profile parameter and/or the at least one process parameter can be predetermined by the at least one sensitivity factor.

The control device can use a method for mathematical optimization with at least one constraint. The constraint can be specified as a penalty function, for example. The penalty function can be symmetrical. For example, for integrating weight and/or wall thickness optimization of the plastic profile, the penalty function may also be asymmetric. The penalty function can, for example, include a sigmoid function, in particular the function $p\_a(x)=1/(1+e^{-x})$.

In one embodiment, a cleaning device is provided that is set up to introduce a cleaning agent into the calibration device in order to remove, in particular, soft deposits that accumulate over time-depending on the material composition of the extruded plastic profile—on the steel surface inside the calibration device. These deposits lead to a deterioration of the surface quality of the extruded plastic profile with increasing production time, but also disturb the extrusion process itself, for example by the plastic profile sticking to the deposit and thus certain profile sections getting stuck, causing rejects and production downtimes.

The cleaning device can, for example, be controlled by the control device, in particular it can be automatically regulated in terms of time and quantity and/or manually controlled by an operator. The cleaning agent can be introduced automatically and/or at predefined intervals. The cleaning agent can be liquid or gaseous.

The cleaning agent can, for example, be sprayed onto the plastic profile, whereby it is then drawn into the gap between the calibration device and the plastic profile. It can also be applied to the calibration device and/or into a flow channel.

By moving the plastic profile in the direction of extrusion, the cleaning agent is introduced/drawn into the calibration device, where it cleans the steel surface inside the calibration device.

In one embodiment, the cleaning device can have at least one flat jet nozzle with which small quantities of cleaning agent are finely atomized with little pressure so that no damage is caused to the plastic profile and thus no rejects are produced during the cleaning process.

A design of the flat spray nozzle that is as flat as possible enables flexible placement in the narrow gap between the nozzle and the calibration device. A bevel at the spray nozzle outlet directs the spray jet in the direction of the calibration device, but not in the direction of the nozzle, in order to avoid a negative influence on the latter. Spraying allows the cleaning agent to be applied to the plastic profile from all angles (from below/top/side). The cleaning device can be screwed and/or magnetically attached to the calibration device. The cleaning device can also be integrated directly into the calibration.

In one embodiment, automatic cleaning of the devices, in particular the calibration devices, is carried out in response to a signal from the control unit. Likewise, the coating measuring device can be coupled to the cleaning device in order to trigger cleaning of the device, in particular the calibration devices or tools of the extrusion device, depending on a measured degree of contamination.

The cleaning device can apply or spread the cleaning agent, in particular spray it on.

In particular, the cleaning agent can be applied as a thin film to the surface of the plastic profile, especially by means of slits or pockets in the calibration device, so that the cleaning agent can be transported by the plastic profile by drag flow. In this way, efficient cleaning can be achieved.

As mentioned, the cleaning agent can be applied e.g. with a nozzle such as a flat jet nozzle. However, it is alternatively or additionally also possible that the cleaning agent of the cleaning device can be applied to the plastic profile through a porous surface, in particular through a porous sinter insert in the calibration device.

It can be useful for the cleaning agent to be dispensed specifically onto a single-walled, in particular protruding profile section of the plastic profile or the entire profile circumference.

An improved cleaning effect can be achieved if the cleaning agent can be applied at intervals. The control device can control the interval times and the quantities.

Furthermore, the object is solved by a method with features as described herein.

For starting up a new plastic profile, a retraction device can be inserted into an extrusion device against the direction of extrusion. The retraction device can have at least one traction means, such as a retraction rod, which may be force-optimized, a retraction belt, a spring steel band and/or a rope. In particular, combinations of traction means are conceivable and possible. The use of the at least one traction means enables a traction force to be introduced into the plastic profile as soon as it emerges from an extrusion nozzle of the extrusion device. The tensile force for calibration can thus be absorbed immediately. The retraction device can have a connecting element for connection to the plastic profile. The plastic profile can be connected to the connecting element after exiting the extrusion nozzle. The connecting element may be connected to the at least one traction means via a coupling element. In particular, the connecting element may be a clamping device. The connecting element may be removable or decoupleable from the coupling element. After connecting the coupling element to the plastic profile, the start-up process can be started. With the retraction device, the plastic profile can be pulled through the entire extrusion device, in particular comprising a calibration device, a removal device as well as a cutting device.

The connecting element can be designed to cool the plastic profile. The connecting element can be metallic, for example, in order to pre-cool the plastic profile sufficiently. In particular, the connection element can be made of aluminum or brass. The connection element can be manufactured by a 3D printing process.

The connecting element can have a connecting section for connecting to the plastic profile. The connecting element can be positively and/or non-positively connected to the plastic profile. For example, the connecting element can have a toothing that engages positively in the plastic profile. In particular, the connecting element can be designed in a pincer-like manner. The plastic profile can be positively and/or non-positively fixed in a jaw of the connecting element. The toothing may be arranged on the jaw. In one embodiment, the toothing is arranged obliquely to the extrusion direction, so that the toothing fixes the plastic profile in the tensile direction. When no tensile force is applied, the connecting element can be detached from the plastic profile by simply opening the jaw. In particular, the jaw can have two clamping jaws between which the plastic profile can be clamped.

The connection element can further have a coupling section for connection to the coupling element. The coupling section may be designed for positive and/or non-positive connection to the coupling element. In particular, the coupling portion may comprise two pincer grips provided for actuating the clamping jaws on the coupling element. Projections on the pincer grips may abut each other to form a recess in a closed position in which the plastic profile is clampable with the clamping jaws. The coupling element may have a projection to which the recess can be fixed for positive connection. In an open position of the connecting element, the projections can be separated so that the connecting element can only be connected to the coupling element in a closed position.

The at least one traction element can be wound on a winding element or rolled on a winding device of the retraction device to draw the plastic profile through the extrusion device.

The following describes an automated start-up process. After dismantling an extrusion nozzle and reassembling a new nozzle on an extrusion line, it is not necessarily ensured that a relative position between extrusion nozzle and dry calibration can be reproduced with sufficient accuracy. A positioning device can be provided to enable a, in particular automatic, exact and reproducible, determination and/or production of the relative position between extrusion nozzle and calibration device. The positioning device can be a mechanical device. In particular, the positioning can be carried out by means of sensors. For example, the positioning device may comprise at least one sensor. For example, the positioning device may comprise a stylus, a sensing cone and/or laser measurement technology. Further sensors can detect and, if necessary, report the correct set-up of the extrusion nozzle and/or the dry calibration.

In one embodiment, the at least one process parameter for the start-up process is set automatically. In particular, the at least one process parameter can be one or more of a vacuum in the wet calibration, a speed in the removal device, a contact pressure in the removal device, a speed of the extrusion screws and/or a temperature in the calibration device.

A profile measuring system can be used to measure a position of inner webs of the plastic profile. The profile measuring system may be located between the wet calibration and the removal device or (additionally or optionally) downstream of the removal device. Sensors and/or valves may be provided on the profile measurement system to control a support air in the extrusion nozzle. Defined air volume flows can be injected into specific profile cavities, in particular to loosen inner webs that are glued during start-up and/or to ensure in-line dimensional accuracy of an inner plastic profile.

As soon as the at least one profile parameter and/or the at least one process parameter, in particular all profile and process parameters, are within a predefined tolerance and/or the profile is assessed as good, a virtual profile marking can be set automatically or via a signal from an operator via the control device and visualized, for example, via a display of the control device for displaying information. By means of the cutting device, a profile pattern is automatically sawn off the plastic profile at this point. The removal speed can be used to calculate when this virtual profile marking reaches the cutting device. The virtual profile marking can, for example, include a time t that the marked profile travels to the cutting device. The time t can be calculated via a removal speed v_a at which the plastic profile is pulled through the extrusion device and a known distance s_b that the plastic profile covers from setting the virtual profile marking to the cutting device using the formula t=s_b/v_a. The start-up process can end with the sawing off of the profile pattern. Production can then be started.

In one embodiment, a force measuring device is provided in the removal device, which measures the removal force and/or detects slippage of the plastic profile in the removal device. The force measuring device can be set up to adjust the contact pressure accordingly. In one variant, the force measuring device is coupled to the control device to transmit the measured values of the removal force and/or a slip value to the control device. The control device can be set up to adjust the contact pressure accordingly on the basis of a predetermined coefficient of friction or one measured in-line by the measuring device and the measured removal force.

In one embodiment, a deposit measuring device is provided within the calibration device, which is arranged to detect deposits adhering to the calibration due to the abrasion of extrudate and/or in interaction with the environment (water/air). In one variant, the deposit measuring device is coupled to the control device to transmit a measured degree of deposits to the control device.

BRIEF DESCRIPTION OF THE DRAWINGS

Based on exemplary embodiments, the monitoring device and the monitoring system are described with reference to the figures.

FIG. 1 shows a schematic representation of an extrusion device with a control device.

FIG. 10 shows views of an embodiment of a slide-in element.

DETAILED DESCRIPTION

Figure 2A:
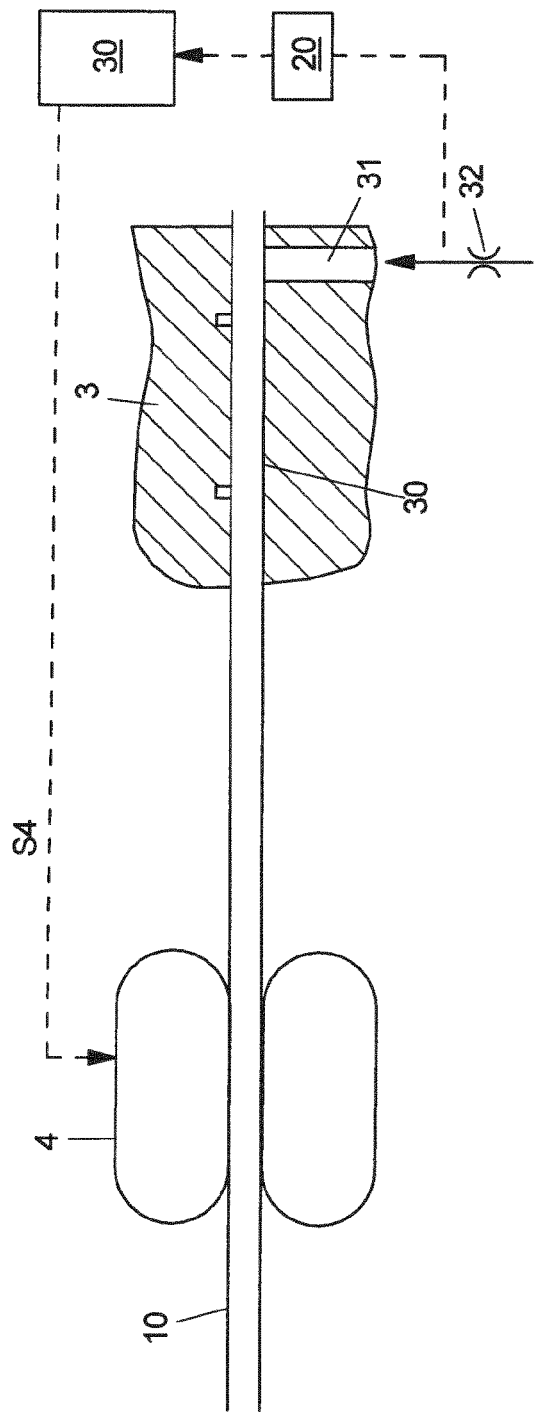
FIGS. 2A and 2B show sectional views of a calibration device.

FIG. 1 shows the schematic structure of an extrusion device known per se, whereby the extrusion direction E here runs from left to right.

A homogeneous melt is conveyed from an extruder 1 in an adjustable quantity at the required temperature into the downstream extrusion nozzle 2. In the extruder, e.g. plastic granulate (one or more types of plastic) is melted, whereby the plastic, highly viscous plastic melt is conveyed by extruder screws in the direction of the extrusion nozzle 2.

The extrusion nozzle 2 shapes the homogeneous plastic melt delivered under pressure into the desired cross-sectional shape, namely a plastic profile, in particular a hollow chamber profile. Temperature control devices can be provided in and/or on the extrusion nozzle, with which, for example, the finished plastic profile can be cooled after it emerges from the extrusion nozzle 2. It is also possible that a temperature control device inside the extrusion nozzle cools and/or heats the forming plastic profile.

A calibration device 3 takes the still thermoplastically deformable plastic profile 10 coming out of the extrusion nozzle 2 and fixes it to the desired dimensions by cooling.

The cooling takes place in the calibration device 3 in a wet calibration and/or a dry calibration. In wet calibration, heat energy is dissipated by water which is brought into contact with the plastic profile 10.

A removal device 4 is connected downstream of the calibration device 3, whereby the plastic profile 10 is typically pulled through a caterpillar take-off.

Downstream of the removal device 4, a cutting device 5 is arranged in extrusion direction E, in which the continuously produced plastic profile 10 is cut to a predetermined dimension, e.g. with a saw.

A weighing device 6, which is connected downstream of the cutting device 5, enables each individual profile bar to be weighed during the extrusion process.

The result should regularly be a plastic profile 10, whose material properties, surface and internal and external dimensional accuracy must meet specified requirements.

In the following, embodiments for a control or regulation are described that can ensure this.

A profile monitoring device 20 is used to detect at least one profile parameter of the plastic profile 10 after it has left the extrusion nozzle 2. This means that a property of the plastic profile 10 is detected on the path between the extrusion nozzle 2, the calibration device 3, the removal device 4, the cutting device 5, the weighing device 6 and/or in at least one of the respective devices 3, 4, 5, 6. Sensors that are aligned with the corresponding property of the plastic profile 10 can be used for this purpose, for example.

In addition to at least one profile parameter, a process monitoring device 21 additionally or alternatively detects at least one process parameter in and/or before the extruder 1, the extrusion nozzle 2, the calibration device 3, the removal device 4, the cutting device 5 and/or the weighing device 6. The recording can also take place in the devices 1, 2, 3, 4, 5, 6 and/or on the path of the plastic profile between the devices 1, 2, 3, 4, 5, 6.

The profile monitoring device 20 and the process monitoring device 21 are shown separately here, although they can also be integrated on a computer.

The data from the profile monitoring device 20 and/or the process monitoring device 21 are then used by a control device 30 to set at least one manipulated variable S1, S2, S3, S4, S5, S6 on the extruder 1, on the extrusion nozzle 2, on the calibration device 3, on the removal device 4, on the cutting device 5 and/or on the weighing device 6 as a function of the data.

Thus, a structure of a multi-variable control is present here, in which the input data are obtained from in the plastic profile 10 and/or from the units 1, 2, 3, 4, 5, 6 of the extrusion device. It is not mandatory that all input and output variables are always linked with each other.

The control device 30 has a means for converting input data into manipulated variables S1, S2, S3, S4, S5, S6. This means can be, for example, a control law (e.g. a PID controller, a model-based controller) which firmly links an input with an output, i.e. a manipulated variable S1, S2, S3, S4, S5, S6. However, the means can also have a more complex model in which many inputs are linked to many outputs, i.e. manipulated variables S1, S2, S3, S4, S5, S6. Such a model can be given as a calculation model and/or in the form of a self-learning model, e.g. in the context of machine learning.

In the following, some profile parameters will be dealt with first. For example, an optical sensor (e.g. a camera and image processing) can be used to detect the wall thickness of the plastic profile. The wall thickness can be an outer wall or the wall of a hollow chamber.

Also with an optical sensor, at least one parameter concerning the surface quality, in particular the colour, the gloss, the streakiness, the roughness and/or the gloss can be determined. This can be done, for example, between the units 1, 2, 3, 4, 5, 6, as the plastic profile 10 is easily accessible here.

With a sensor, e.g. a camera, at least one parameter of the shape deviation of the plastic profile 10 from a predetermined shape can be detected. E.g. with image processing, in particular a curvature parameter and/or an angle parameter can be determined, which represents the deviation from a standard.

An infrared transmitter can also be used to determine at least one temperature of the plastic profile 10, whereby for reasons of accessibility, this measurement is also sensibly carried out between units 1, 2, 3, 4, 5, 6.

In the following, some process parameters are shown that can be used as an alternative or in addition to the profile parameters.

The speed of the plastic profile 10 is determined by the removal speed of the removal device 4.

A camera system or other optical sensor can also be used to ensure at least a correct geometrical alignment of the calibration device 3 and/or the removal device 5 to the extrusion nozzle 2. If, for example, the centering of the plastic profile 10 deviates from the standard value, this leads, for example, to bending, twisting and stresses in the material.

For a correct cooling, in particular in the calibration device 4, for example at least one temperature value and/or one pressure value can be measured in the extruder 4, in the extrusion nozzle 2, in the calibration device 3 and/or in the removal device 4, since a predetermined temperature profile should generally be established along the extrusion profile 10.

At the removal device 4, for example, the removal force, a slip and/or the removal speed can be measured, as these parameters have an influence on the entire plastic profile 10.

Parameters that can be recorded on the cutting device 5 are the lengths and/or the mass of the cut plastic profiles 10.

The weight of the cutting profile bars can be determined at the weighing device 6.

Thus, the embodiment has a range of parameters that can serve as input variables for the control device 30. It should be noted that, of course, not all of the input variables have to be measured simultaneously in every case. Subsets of the profile parameters and/or the process parameters can be used.

In the control device 30, these input values can then be used to determine manipulated variables S1, S2, S3, S4, S5, S6. Again, it is not mandatory that all possible manipulated variables S1, S2, S3, S4, S5, S6 are used.

In the following, some manipulated variables are described in more detail. One manipulated variable on extruder 1 is the mixture setting of the plastic fed to extruder 1. This manipulated variable S1 can be used, for example, to compensate for deviations in the plastic quality and/or colour. The temperature and/or the speed of the extrusion screws in the extruder also have an influence on the type of plastic profile 10 to be formed.

For the extrusion nozzle 2, for example, at least one temperature can be a useful manipulated variable S2. This does not necessarily mean an averaged temperature over the extrusion nozzle 2 or the cross-section of the plastic profile 10. Rather, parts of the plastic profile 10 can be specifically influenced with suitable temperature control devices on and/or in the extrusion nozzle 2. The temperature in the extrusion nozzle 2 has an influence on the viscosity of the plastic and thus on the flow speed.

In the calibration device there are a number of manipulated variables S3 that have an influence on a thermal behaviour. For example, the temperature and/or the water flow can be controlled at one or more points. The use of pressure as manipulated variable S3 has an influence on the shape of the plastic profile 10. However, it is also possible to adjust geometrical parameters with manipulated variables S3, for example, by the at least one manipulated variable S3 at the calibration device 3 being an automatic positioning change of at least one calibration nozzle with respect to the extrusion nozzle 2. This makes it possible to compensate for alignment errors between the calibration device 3 and the extrusion nozzle 2.

On the removal device 4, the at least one manipulated variable S4 can influence the removal speed and/or the contact pressure.

Figure 2B:
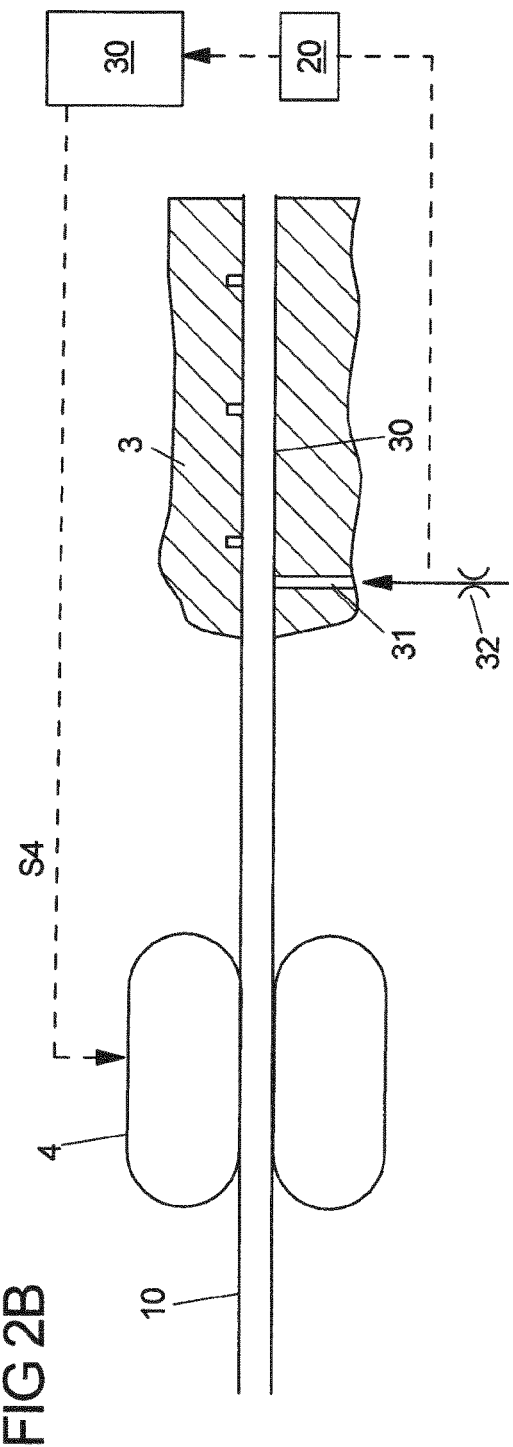

In the embodiment example shown in FIG. 2A and FIG. 2B, the calibration device 3 is set up to enable detection of the degree of filling of the walls of plastic profiles, in particular solid profiles. On the calibration device 3, in operation, a gap is formed between an inner surface of a passage 30 of the calibration device 3, through which the plastic profile 10 passes, and the plastic profile 10. The calibration device 3 is further adapted to direct a gaseous medium into the gap. The gaseous medium is directed into the gap through a passage 31 from a source 32 for the gaseous medium, such as an air nozzle.

The passage 31 can be arranged in a front section of the dry calibration device in the direction of extrusion, as shown in FIG. 2A, or in a rear section of the dry calibration device in the direction of extrusion, as shown in FIG. 2B. In principle, the passage 31 can also be arranged in a middle section of the calibration device 3. The gaseous medium can also be fed into the passage through a plurality of passages.

The gaseous medium is extracted through vacuum channels and/or escapes from the dry calibration, for example, through a front intake. The dynamic pressure of the gaseous medium depends on the size of the gap. If the gap narrows, the dynamic pressure in the medium increases. This means that the wall of the plastic profile is thicker. The degree of filling is therefore greater. The dynamic pressure is determined by measuring the pressure in the supply line at a constant volume flow of the gaseous medium.

A probability of the plastic profile getting stuck on the dry calibration depends on the size of the gap. With a small gap, the probability of getting stuck is greater than with a large gap. The degree of filling is recorded via the profile monitoring device, if necessary, using the dynamic pressure. The control device uses the data and is arranged to do one or more of the following: (i) triggering an alarm, (ii) adjusting a manipulated variable S4 on the removal device 4 as a function of the degree of filling, for example making the removal device 4 take off the plastic profile faster or slower or making the calibration device 3 move backwards in the extrusion direction.

By detecting the degree of filling, the risk of the plastic profile getting stuck between the extrusion nozzle and the dry calibration is reduced. This can reduce the production of rejects, i.e. plastic profiles with undesired profile parameters. It also reduces the risk of having to interrupt production for maintenance of the extrusion device.

Figure 3:
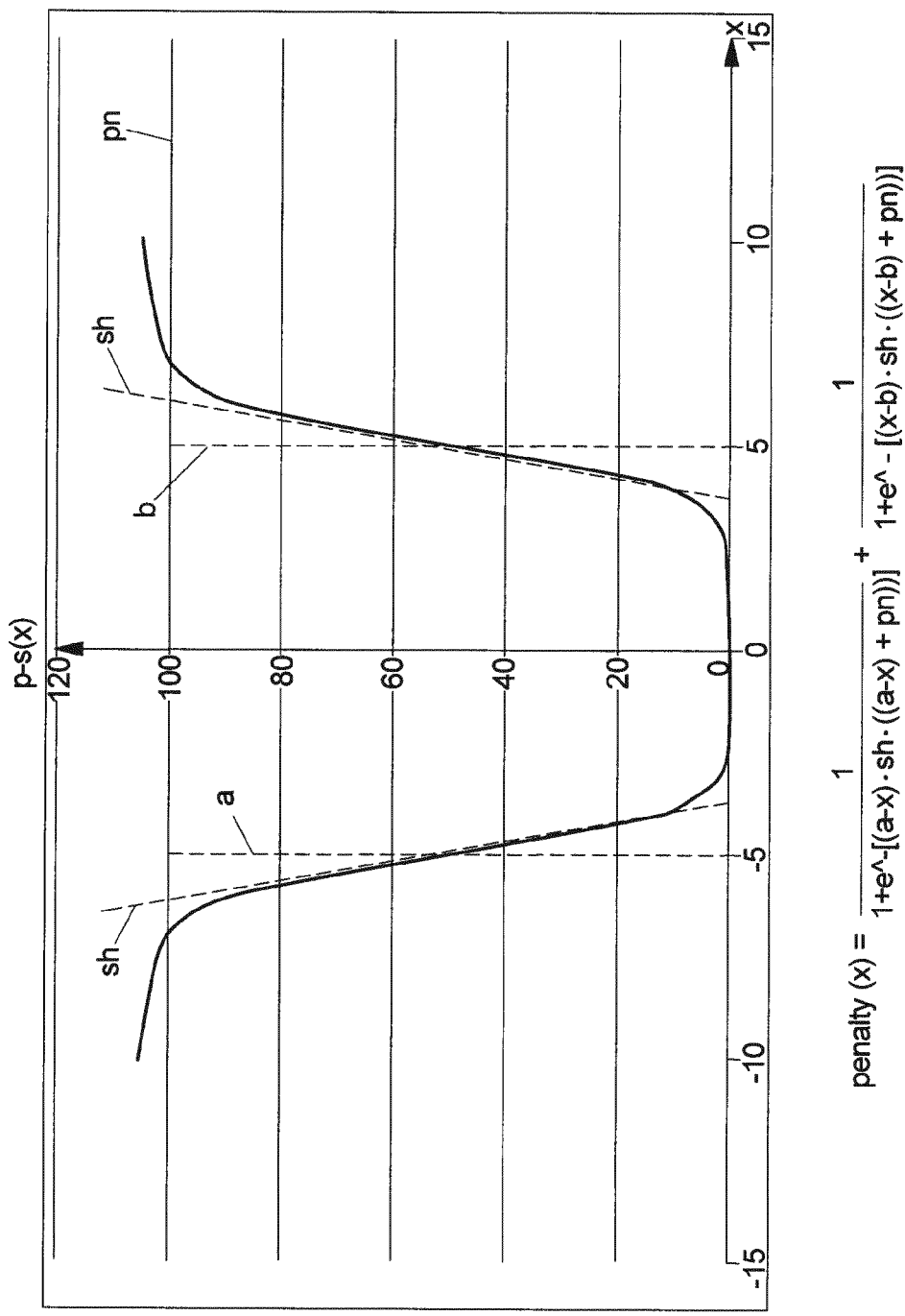
FIG. 3 shows graphical representation of a symmetrical penalty function.

FIG. 3 shows a representation of a penalty function as a function $p\_s(x)=1/(1+e^{-((a-x)*sh*((a-x)+pn))})+1/(1+e^{-((x-b)*sh*((x-b)+pn))})$. The function is symmetrical. The parameters a and b indicate the limits of a desired interval for at least one manipulated variable, at least one process parameter or at least one profile parameter. The parameter sh stands for a sharpness of a constraint, described by the penalty function, in the range of the limits. The parameter pn represents a factor for the significance of the constraint. Mathematically, sh stands for a slope of the function p_s at the boundaries a, b and pn for a height to which p_s rises at the boundaries a, b. In the embodiment example shown, the desired interval is located between the values −5 and 5. A penalty for values x that lie outside the desired interval is at a height pn of 100. The slope sh is 2. Such a penalty function can be used, for example, to specify a desired interval for the vacuum at the calibration device or the crowning of the plastic profile. In particular, such a function may be suitable for prescribing the largest possible allowed interval for the selection of the at least one manipulated variable, the at least one process parameter or the at least one profile parameter, so that the process window is as large as possible. The goal is a minimum profile weight with maximum output, minimum rejects and minimum energy consumption.

Figure 4:
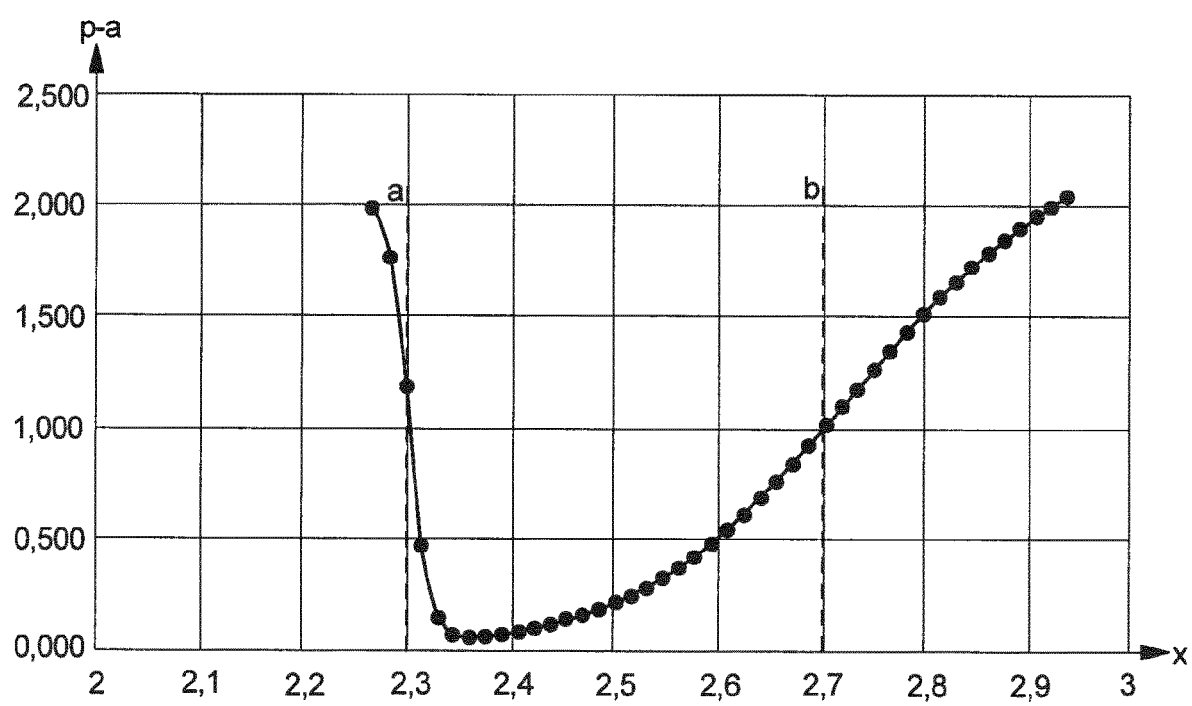
FIG. 4 shows graphical representation of an asymmetric penalty function.

FIG. 4 shows another version of a penalty function p_a(x). The function is asymmetric. The parameters a and b indicate the limits of a desired interval of at least one manipulated variable, at least one process parameter or at least one profile parameter. The slope at the limits is different in the present embodiment example. Values of x that lie below the boundary a are thus penalized more heavily (i.e. not used in the optimization or taken into account less) than values that lie above the boundary b. An optimization under such a constraint therefore tends to result in values above the limit a being specified. Such a constraint can be particularly suitable for wall thickness or weight per metre of a plastic profile, since wall thickness and weight per metre must not fall below a certain minimum lower limit, but larger values can be acceptable in principle. Furthermore, the minimum is close to the lower limit so that the function can be used to optimize material consumption.

Figure 5:
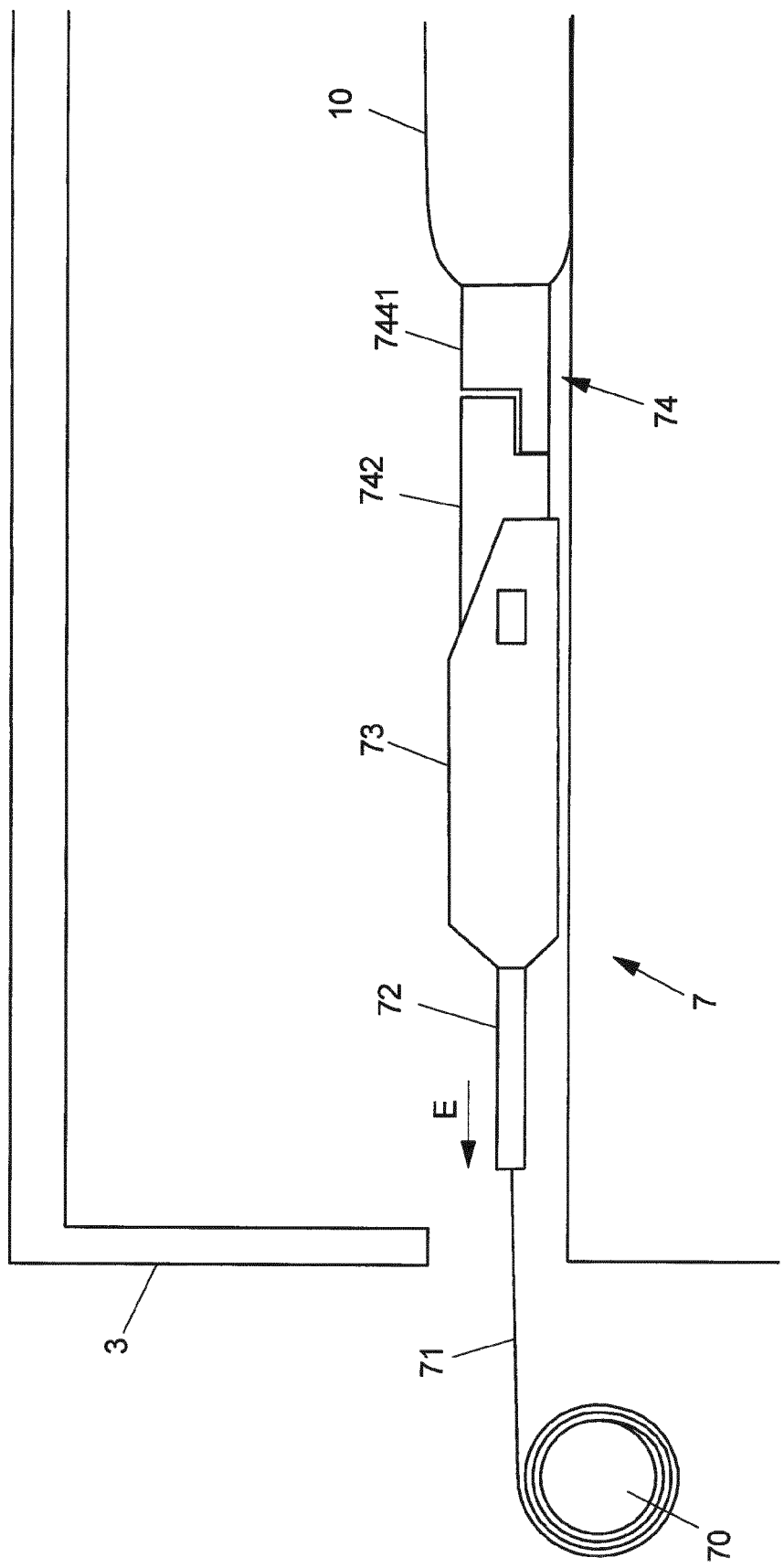
FIG. 5 shows a view of a retraction device.

FIG. 5 shows a view of a retracting device 7 on a calibration device 3 with a winding element 70 on which a flexible traction means 71 in the form of a rope can be wound. A rigid traction means 72, which is designed as a rod, is arranged on the flexible traction means 71. The rod 72 is arranged on a coupling element 73. The coupling element 73 is connected to a connecting element 74. The connecting element 74 is connected to a plastic profile 10, which is pulled through the calibration device 3 by the retraction device 7.

Figure 6:
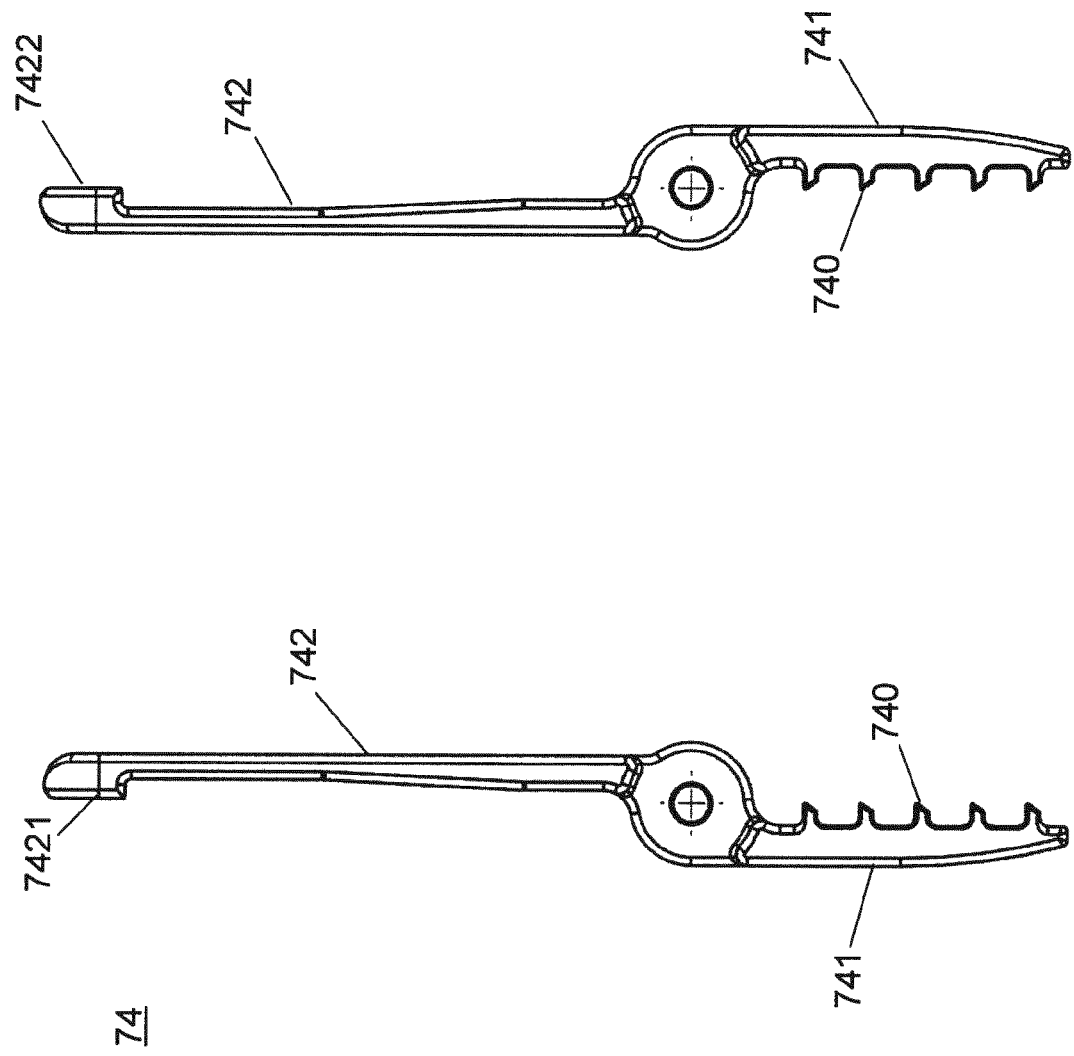
FIG. 6 shows a view of a connection element.

FIG. 6 shows a view of a connecting element 74. The connecting element 74 comprises two pincer parts which can be connected to each other in a pincer-like manner, so that a jaw 7410 of the connecting element 74 can be opened by a scissor-like movement of the two pincer parts relative to each other. A toothing 740 is arranged on each pincer part at a connection section 741, which is provided for connection to the plastic profile 10. The connecting element 74 further comprises a coupling section 742, which is provided for connection to the coupling element 73. A projection 7421, 7422 is arranged on the coupling section 742 for each pincer part, wherein the projections of the pincer parts adjoin each other in the closed state of the connecting element 74.

Figure 7:
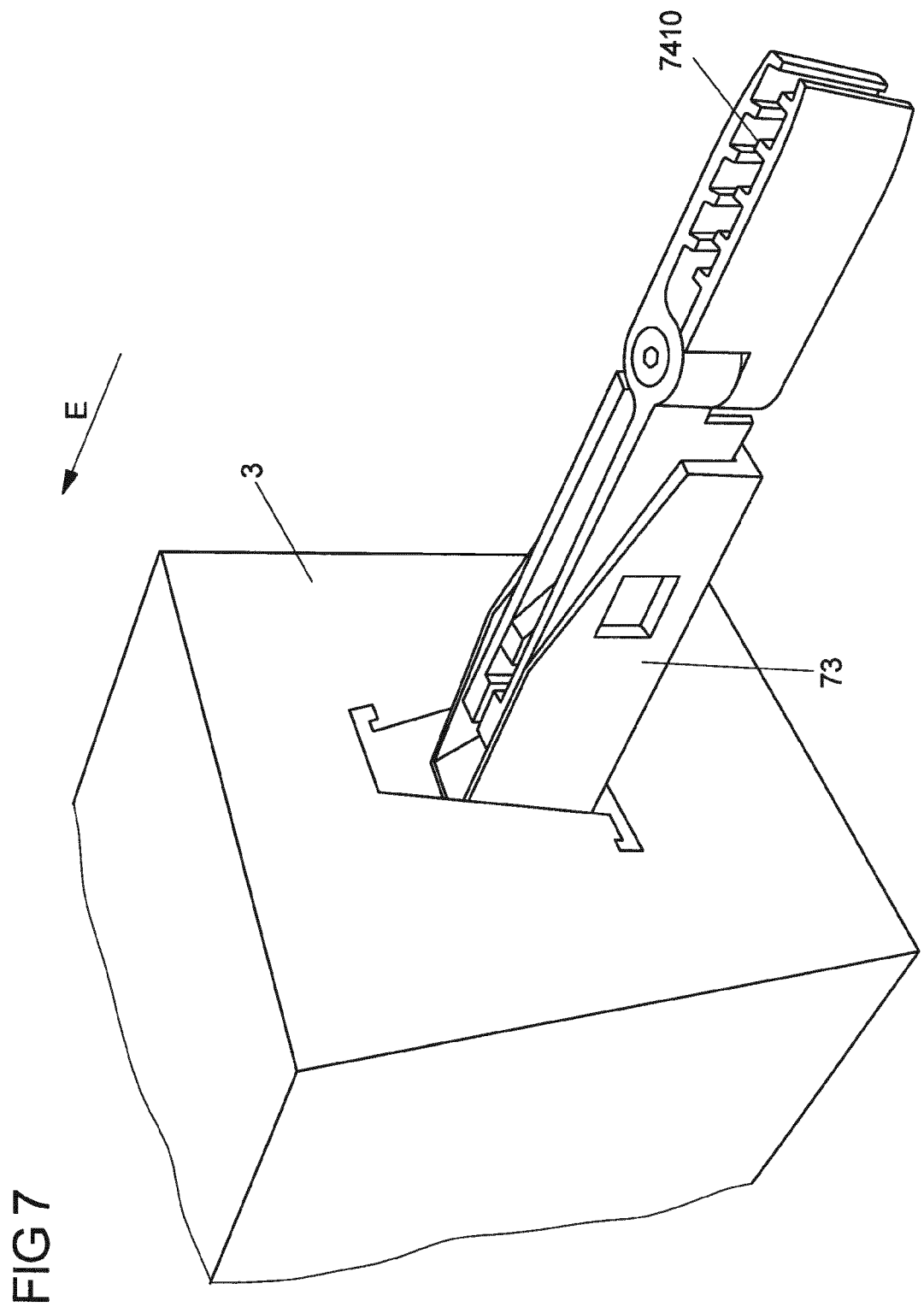
FIG. 7 shows a view of a retracting device which is arranged at a extrusion device.

FIG. 7 shows a view of a retraction device 7 arranged on an extrusion device. The retraction device 7 has been inserted into a calibrating device 3 against an extrusion direction, so that a connecting element 74 of the retraction device 7 protrudes from the calibrating device 3 for connecting a plastic profile 10 to the retraction device 7.

Figure 8:
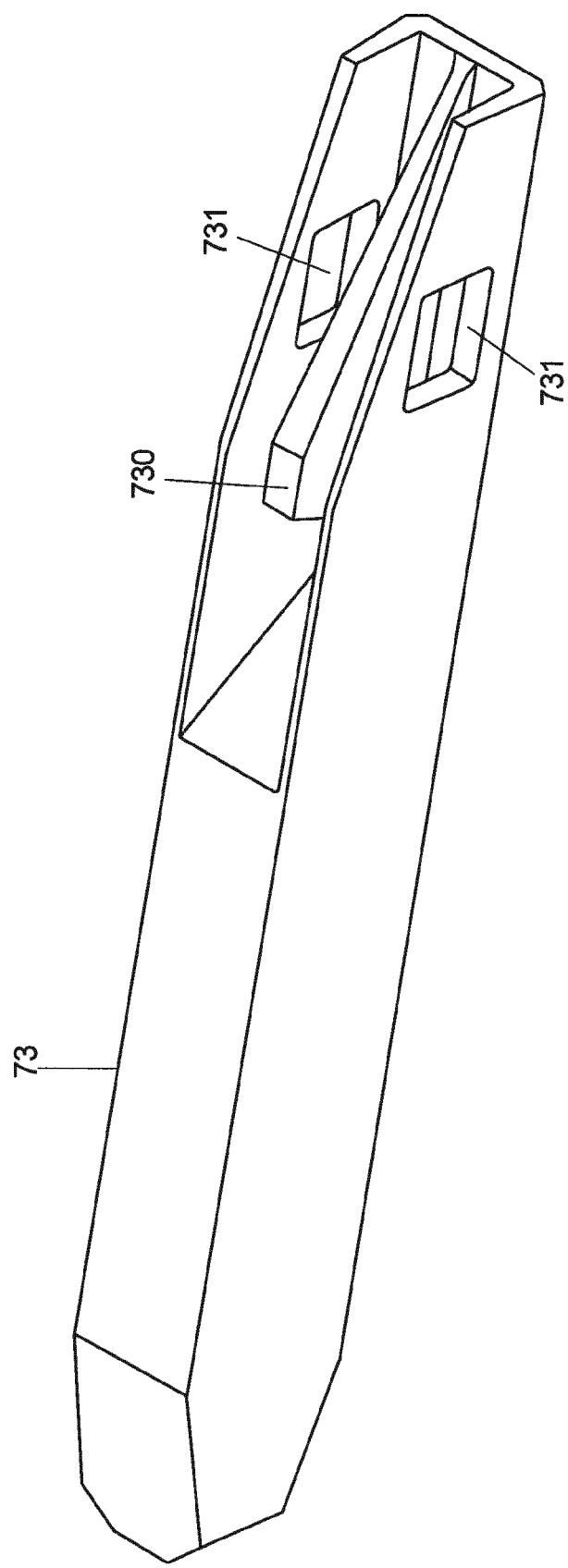
FIG. 8 shows a view of a coupling element.

FIG. 8 shows a view of a coupling element 73. The coupling element 73 has a projection 730 on which the connecting element 74 can be fixed. Furthermore, two recesses 731 are provided on the coupling element 73, in which wings 751 of an insertion element 75 can engage. In principle, at least one recess 731 for the insertion element 75 can be provided on the coupling element 73.

Figure 9:
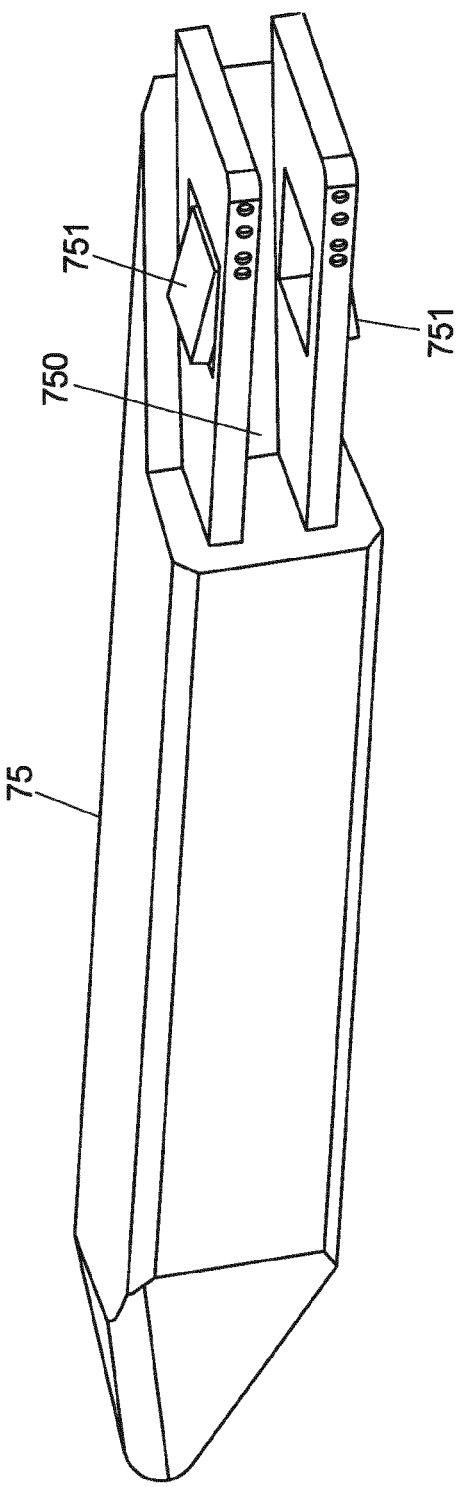
FIG. 9 shows a view of an embodiment of a slide-in element.

FIG. 9 shows a view of an embodiment of a slide-in element 75. The slide-in element 75 is used for connection to the coupling element 73 for simply pushing the coupling element 73 through the calibrating device 3 or another device of the extrusion device against the extrusion direction E. The slide-in element 75 is removed from the coupling element 73 before the plastic profile 10 is drawn in. Afterwards, the connecting element 74 is hooked in. The slide-in element 75 has an engagement 750 in which the projection 730 of the connecting element 74 can be inserted. Furthermore, the slide-in element 75 has two wings 751 which are provided to engage in recesses 731 on the connecting element 74, so that the connecting element 74 and the slide-in element 75 are positively connected in a direction opposite to the extrusion direction.

FIG. 10 shows further views of an embodiment of the slide-in element 75.

Figure 11:
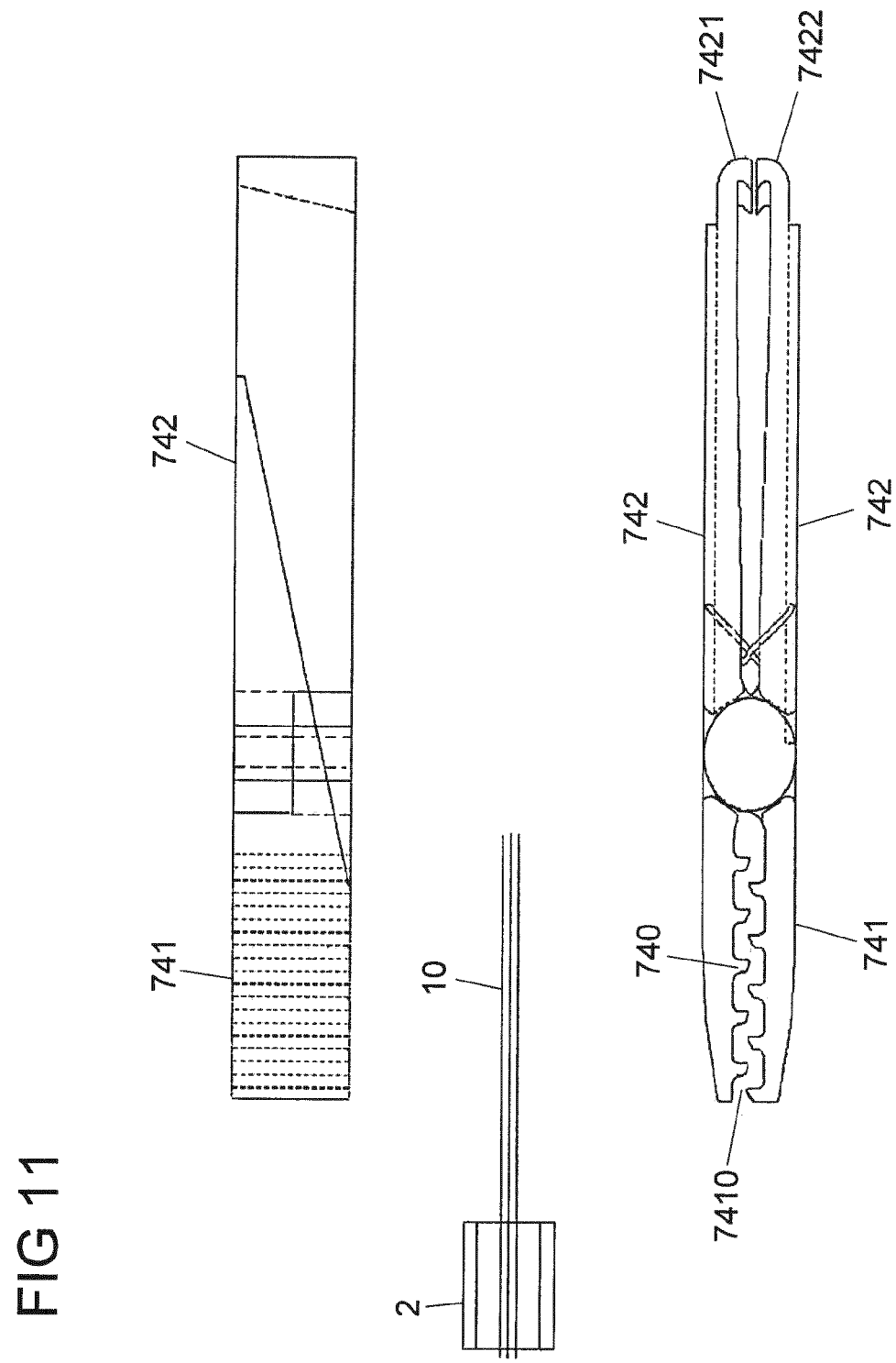
FIG. 11 shows views of an embodiment of a connection element.

FIG. 11 shows views of an embodiment of a connecting element 74 and an extruded plastic profile 10 to which the connecting element 74 can be connected.

Figure 12:
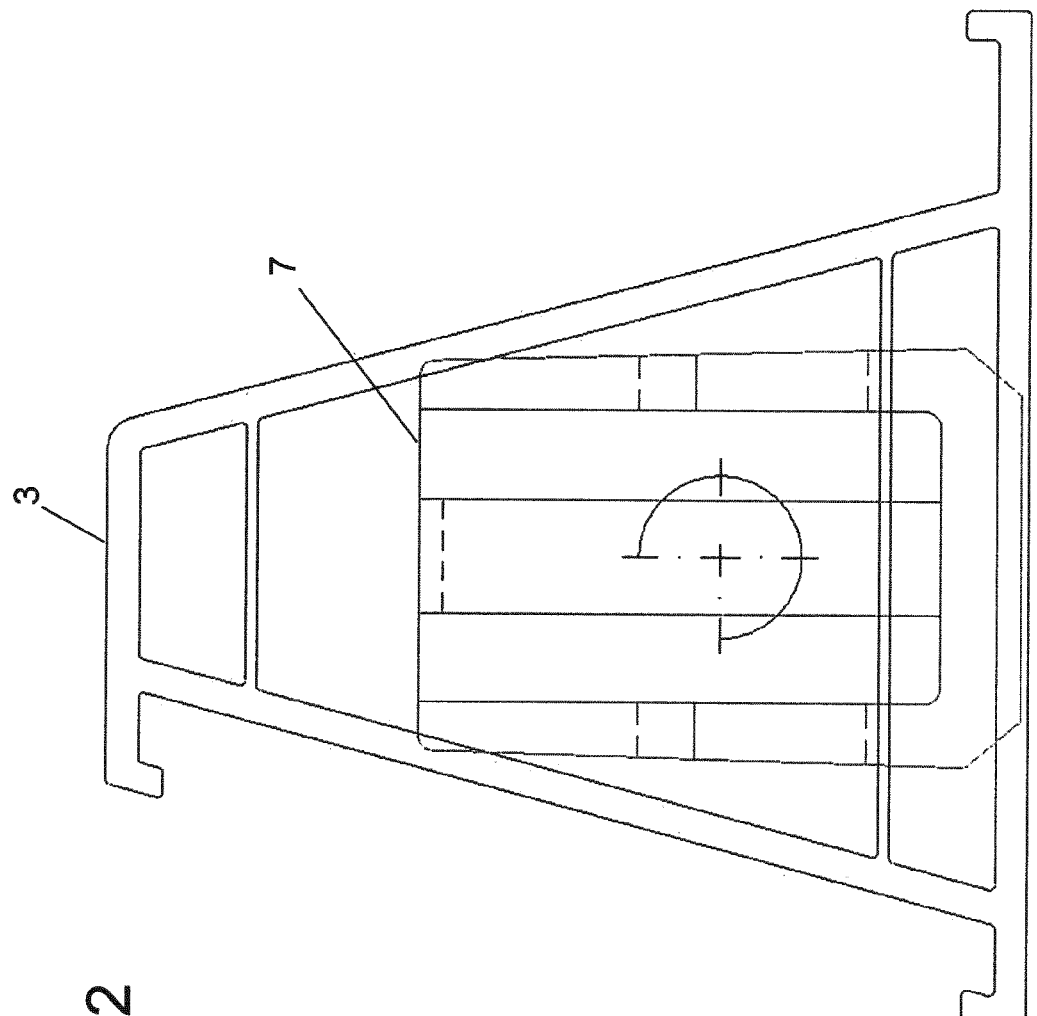
FIG. 12 shows cross-section through a calibration device through which a retractor is pulled.

FIG. 12 shows a cross-section through a calibration device 3 through which a retracting device is pulled. 7

Figure 13:
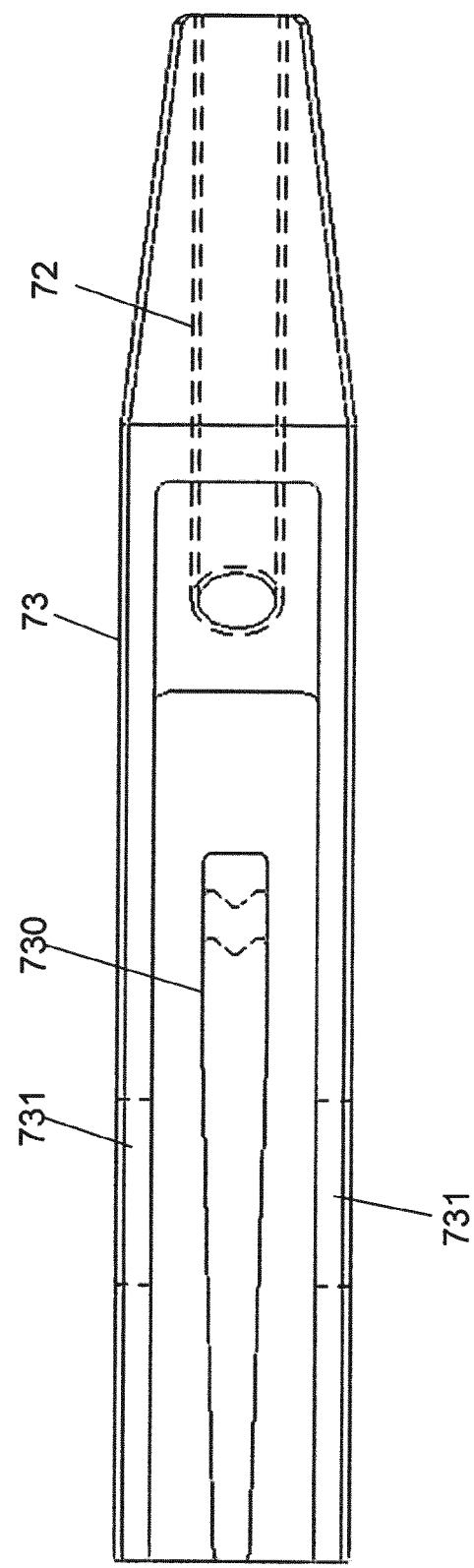
FIG. 13 shows a view of an embodiment of a coupling element.
Figure 14:
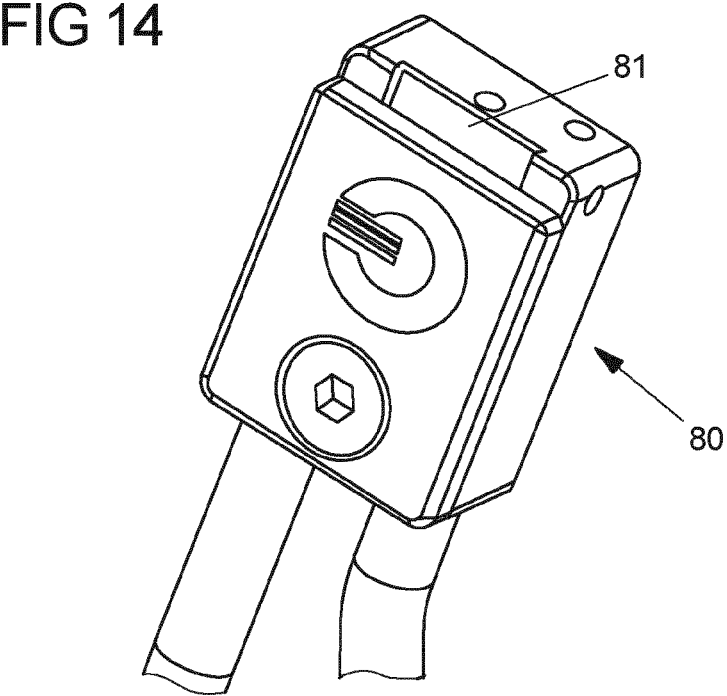
FIG. 14 shows a schematic representation of a cleaning device with a bottle jet nozzle.

FIG. 13 shows a view of an embodiment of a coupling element 73. A rigid traction means 72 is arranged on the coupling element 73;

FIG. 14 shows a schematic representation of a cleaning device 80 with a flat jet nozzle 81. This can be used, for example, to generate a jet of a cleaning agent in a defined width and direction which, in particular, does not impair the still soft surface of the plastic profile 3. Such a cleaning device 80 can be part of a system with which a cleaning agent can be introduced into or connected to the calibration device 3 (see FIG. 16) in order to remove it from soft deposits that accumulate over time—depending on the material composition of the extruded plastic profile 10—on the steel surface inside the calibration device 3.

The cleaning device 80 is not only supplied with cleaning agent, but also with signals from the control device 30. In this way, in particular, a temporal and/or quantitative control of the jet can take place, whereby the cleaning agent can comprise a liquid, a gas or a mixture of both. One possibility of control is that the cleaning agent is applied at intervals. If the cleaning agent is applied as a thin film, it can be drawn into the gap between the calibration device and the plastic profiles and cause cleaning there.

Figure 15:
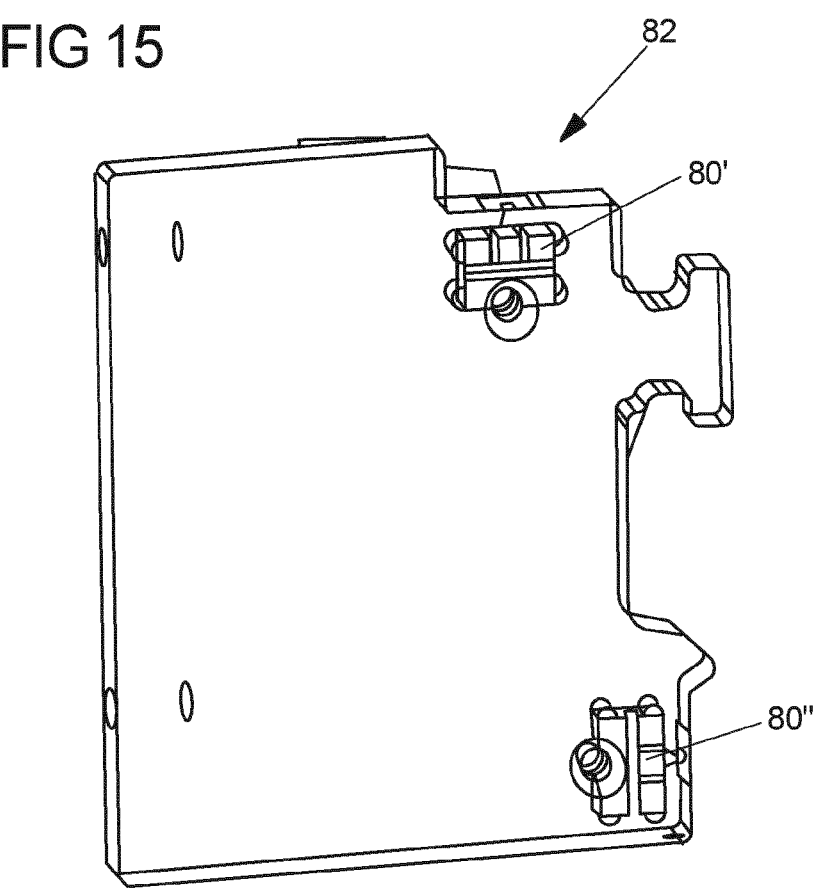
FIG. 15 shows a component with two cleaning devices.

FIG. 15 shows a component 82, which can be connected to a calibration device 3 not shown here, with two cleaning devices 80, whereby the upper cleaning device 80' emits the cleaning agent upwards, the lower cleaning device 80" emits to the right. The cleaning device 80 is designed here with a flat jet nozzle 81, although in principle other nozzle shapes, e.g. with a circular cross-section, can also be used.

Figure 16:
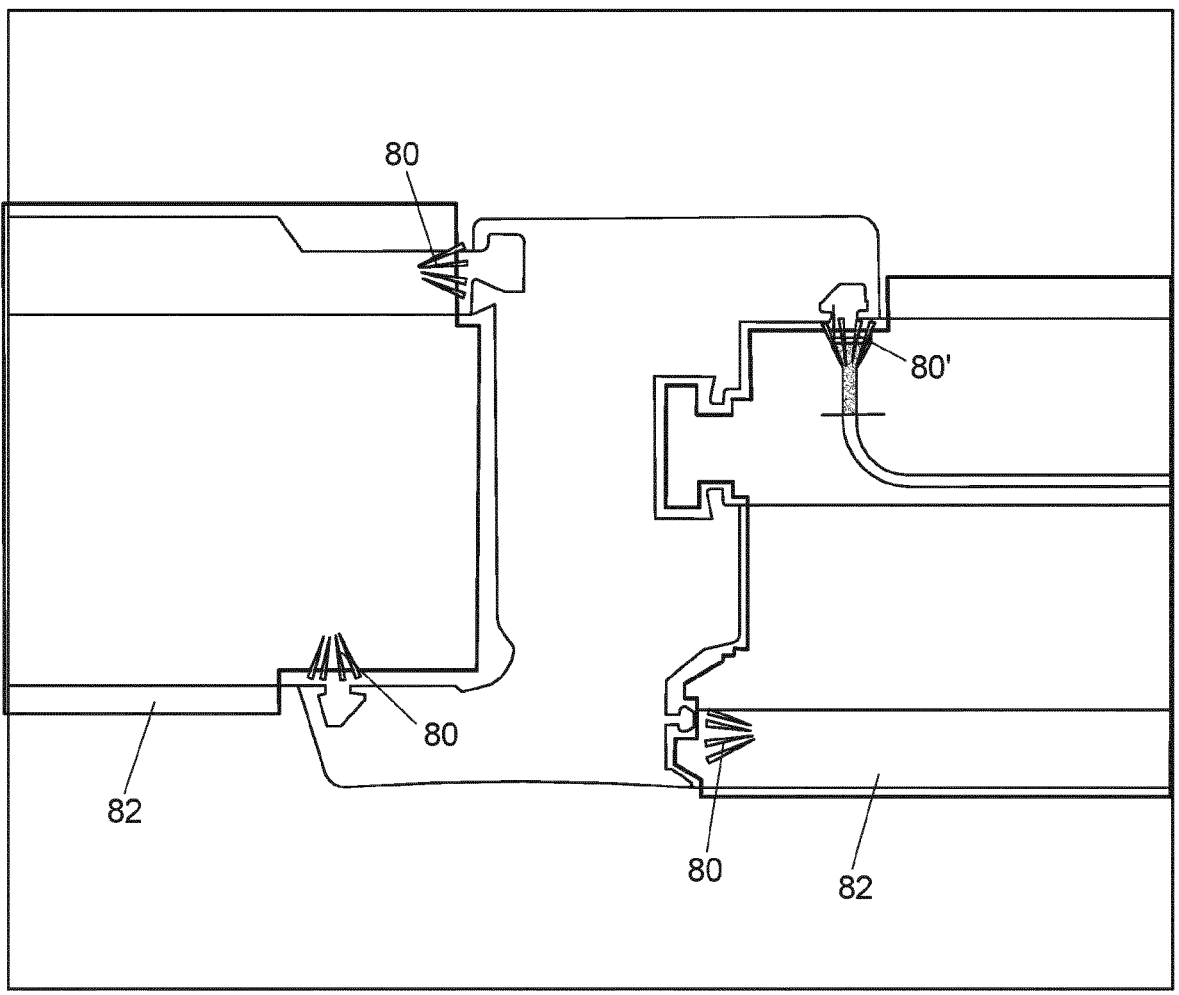
FIG. 16 shows a sectional view with two construction elements with four cleaning devices.

The jets of cleaning agent are shown in more detail in FIG. 16, where two construction elements 82 are provided with a schematically shown calibration device 3 with a total of four cleaning devices 80, which again also have flat jet nozzles. The components 82 are arranged on both sides of the flow channel for the plastic profile 10.

In the embodiment shown here, the cleaning agent is applied specifically to single-walled profile sections, whereby the contours in the flow channel are shown accordingly in FIG. 16. The single-walled profile sections can also protrude slightly from the plastic profile 10. In this case, the cleaning agent can be drawn into the gap between the plastic profile 10 and the calibration device 3 (indicated here by a rectangular area) as part of a drag flow.

In the case of the cleaning device 80' at the top right in FIG. 16, the supply line of the cleaning agent is shown, which is emitted upwards here. For the three other cleaning devices 80, the directions of emission are only graphically indicated.

In principle, more or less cleaning devices 80 can also be used

LIST OF REFERENCE SIGNS

1 Extruder
2 Extrusion nozzle
3 Calibration device
30 Gap
4 Removal device
5 Cutting device
6 Weighing device
10 Plastic profile
20 Profile monitoring device
21 Process monitoring device
30 Control device
7 Retracting device
70 Winding element
71 flexible traction means
72 rigid traction means
73 Coupling element
730 Projection
731 Recess
74 Connection element
740 Interlocking
741 Connection section
7410 Mouth
7411 Clamping jaw
7412 Clamping jaw
742 Coupling section
7421 Projection
7422 Projection
75 Slide-in element
750 Engagement
751 Wing
80 Cleaning device
81 Flat jet nozzle
82 Component
a, b Limit
sh Sharpness
pn Height
E Extrusion direction

The invention claimed is:

1. An extrusion device for a plastic profile, with an extruder, an extrusion nozzle arranged at the exit of the extruder for forming the plastic profile, wherein the plastic profile is subsequently guided through a calibration device, a downstream removal device for the plastic profile and a cutting device for separating parts of the extruded plastic profile, comprising:
a profile monitoring device for detecting at least one profile parameter of the plastic profile in the extrusion direction after it has emerged from the extrusion nozzle and/or
a process monitoring device for detecting at least one process parameter in and/or before:
the extruder,
the extrusion nozzle,
the calibration device,
the removal device, and/or
the cutting device,
wherein the data of the profile monitoring device and/or the process monitoring device is used by a control device to adjust at least one manipulated variable or a set of manipulated variables on the extruder, on the extrusion nozzle, on the calibration device, on the removal device and/or on the cutting device as a function of the data,
wherein the control device is configured to perform a mathematical optimization of a set of manipulated variables under at least one constraint with respect to a value of the at least one profile parameter, the at least one process parameter and/or the at least one manipulated variable of the set of manipulated variables and wherein the at least one constraint is a penalty function,
wherein the at least one manipulated variable on the extruder is at least one of the group of:
a mixture setting of at least one of the plastic fed to the extruder, the temperature, and/or a rotational speed of the extrusion screws,
a temperature which can be set by a temperature control device; or
a fluid flow which tempers at least a part of the plastic profile inside the extrusion nozzle and/or outside the extrusion nozzle; and
wherein the at least one manipulated variable at the calibration device is at least one of the group of:
a temperature and/or a pressure, in a dry and/or wet calibration and/or a water flow rate in a wet calibration; or a positioning change of at least one dry calibration device with respect to the extrusion nozzle.

2. The extrusion device according to claim 1, wherein the at least one profile parameter is at least one of:
at least one wall thickness of the plastic profile,
at least one parameter concerning the surface quality,
at least one parameter of the shape deviation of the plastic profile from a predetermined shape,
at least one main wall thickness of the plastic profile, or
at least one metre weight of the plastic profile.

3. The extrusion device of claim 2, wherein:
the at least one parameter concerning the surface quality comprises at least one of a color, a gloss, or a streakiness of the plastic profile; and
the at least one parameter of the shape deviation of the plastic profile from the predetermined shape comprises at least one of a curvature parameter or an angle parameter.

4. The extrusion device according to claim 1, further comprising an optical detection device for wall thicknesses of the plastic profile, for the surface quality of the plastic profile and/or the shape deviation of the plastic profile.

5. The extrusion device according to claim 1, wherein the at least one process parameter is at least one of:
at least one motor load of the extruder,
at least one geometric alignment of the calibration device and/or the removal device with the extrusion nozzle,
at least one temperature and/or pressure in the extruder, in the extrusion nozzle, in the calibration device and/or in the removal device,
at least one force measurement on the removal device and/or a measurement of the removal speed, or
at least a length measurement and/or a weighing at the cutting device.

6. The extrusion device according to claim 1, wherein the at least one profile parameter and/or process parameter detected in-line can be used automatically by the control device for setting at least one control signal or a suggestion for a mode of operation of the extrusion device is transmitted to an operator.

7. The extrusion device according to claim 1, the control device comprises a means for multivariable control, wherein the detected profile parameters and/or the detected process parameters serve as input variables.

8. The extrusion device according to claim 1, wherein the control device is configured to automatically determine a model for determining the relationships between the at least one profile parameter, the at least one process parameter, and the at least one manipulated variable.

9. The extrusion device of claim 8, wherein the model further comprises a model for multivariable control.

10. The extrusion device according to claim 1, further comprising at least one cleaning device for dispensing a cleaning agent.

11. The extrusion device according to claim 10, wherein the delivery of the cleaning agent is controlled or regulated by the control device.

12. The extrusion device according to claim 10, wherein at least one of:
the cleaning agent is applied by spraying, or
the cleaning agent is applied as a thin film to the surface of the plastic profile by means of the cleaning device.

13. The extrusion device of claim 12, wherein the cleaning agent is applied as the thin film to the surface of the plastic profile by means of the cleaning device, including by means of slits or pockets in the calibration device, so that the cleaning agent can be transported along by the plastic profile by drag flow.

14. The extrusion device claim 10, wherein at least one of:
the cleaning agent of the cleaning device is deliverable through a porous surface,
the cleaning agent is deliverable in a targeted manner onto a single-walled profile section of the plastic profile or the entire profile circumference, or
the cleaning agent is applied at intervals.

15. The extrusion device of claim 14, wherein at least one of:
the cleaning agent is further deliverable through a porous sinter insert in the calibration device; or
the single-walled profile section of the plastic profile comprises a protruding profile section of the plastic profile.

16. The extrusion device of claim 10, wherein the at least one cleaning device for dispensing a cleaning agent comprises a flat jet nozzle.

17. The extrusion device of claim 1, wherein the plastic profile comprises a hollow chamber profile.

18. The extrusion device of claim 1, wherein the temperature is a temperature which can be set local to a region of the plastic profile.

19. The extrusion device of claim 1, wherein the control device is configured to perform the mathematical optimization with a symmetric penalty function for the at least one manipulated variable with limits of a desired interval for the at least one manipulated variable and parameters indicating the sharpness of the limits.

20. The extrusion device according to claim 1, wherein the control device is configured to perform the mathematical optimization with an asymmetric penalty function for the at least one manipulated variable with limits of the desired interval for the at least one manipulated variable and where the slopes at the limits are different, so that values outside one limit are penalized differently from values outside the other limit.

* * * * *